United States Patent
Nagano

[19]

[11] Patent Number: 5,953,295
[45] Date of Patent: Sep. 14, 1999

[54] FOCUSING ERROR DETECTING EQUIPMENT

[75] Inventor: Tsuyoshi Nagano, Tokyo, Japan

[73] Assignee: NEC Corporation, Tokyo, Japan

[21] Appl. No.: 08/970,429

[22] Filed: Nov. 14, 1997

[30] Foreign Application Priority Data

Nov. 14, 1996  [JP]  Japan ..................................... 8-302673

[51] Int. Cl.$^6$ ...................................................... G11B 7/09
[52] U.S. Cl. ........................................ 369/44.23; 369/112
[58] Field of Search ............................. 369/44.23, 44.14, 369/44.12, 44.37, 44.41, 109, 112, 103

[56] References Cited

U.S. PATENT DOCUMENTS

| | | | |
|---|---|---|---|
| 5,570,333 | 10/1996 | Katayama ................................ | 369/109 |
| 5,638,352 | 6/1997 | Yang ...................................... | 369/44.23 |
| 5,737,296 | 4/1998 | Komma et al. .......................... | 369/112 |
| 5,757,754 | 5/1998 | Yamamoto et al. .................... | 369/44.14 |

FOREIGN PATENT DOCUMENTS

| | | | |
|---|---|---|---|
| 0225930 | 9/1988 | Japan .................................... | 369/44.23 |
| 63-225930 | 9/1988 | Japan . | |
| 63-229640 | 9/1988 | Japan . | |
| 5-298721 | 11/1993 | Japan . | |

OTHER PUBLICATIONS

Tsuyoshi Nagano, et al., "Application of flip–chip bonding method to optical heads", pp. 103–109, Proceedings of 12th Meeting on Lightwave Sensing Technology, Japanese Society of Lightwave Sensing Technology, Japan Society of Applied Physics.

*Primary Examiner*—Thang V. Tran
*Attorney, Agent, or Firm*—Young & Thompson

[57] ABSTRACT

Disclosed is a focusing error detecting equipment, which has a light-generating device; an image-forming device for converging light to be emitted from the light-generating means upon a focusing error detected object; a diffraction element for diffracting light to be reflected on the focusing error detected object; and a light-detecting device for receiving lights to be separated by the diffraction element; wherein the diffraction element is divided into four regions a, b, c and d by a boundary plane α and a boundary plane β, the regions a and c to be located diagonally diffracting the reflected light into lights with a convergence point before the light-detecting device and the regions b and d to be located diagonally diffracting the reflected light into lights with a convergence point behind the light-detecting device, the light-detecting device has light-receiving parts ea and eb which are divided by a division line e parallel with the boundary plane α, light-receiving parts fa and fb which are divided by a division line f parallel with the boundary plane α, light-receiving parts ga and gb which are divided by a division line g parallel with the boundary plane α and light-receiving parts ha and hb which are divided by a division line ha parallel with the boundary plane α.

12 Claims, 30 Drawing Sheets

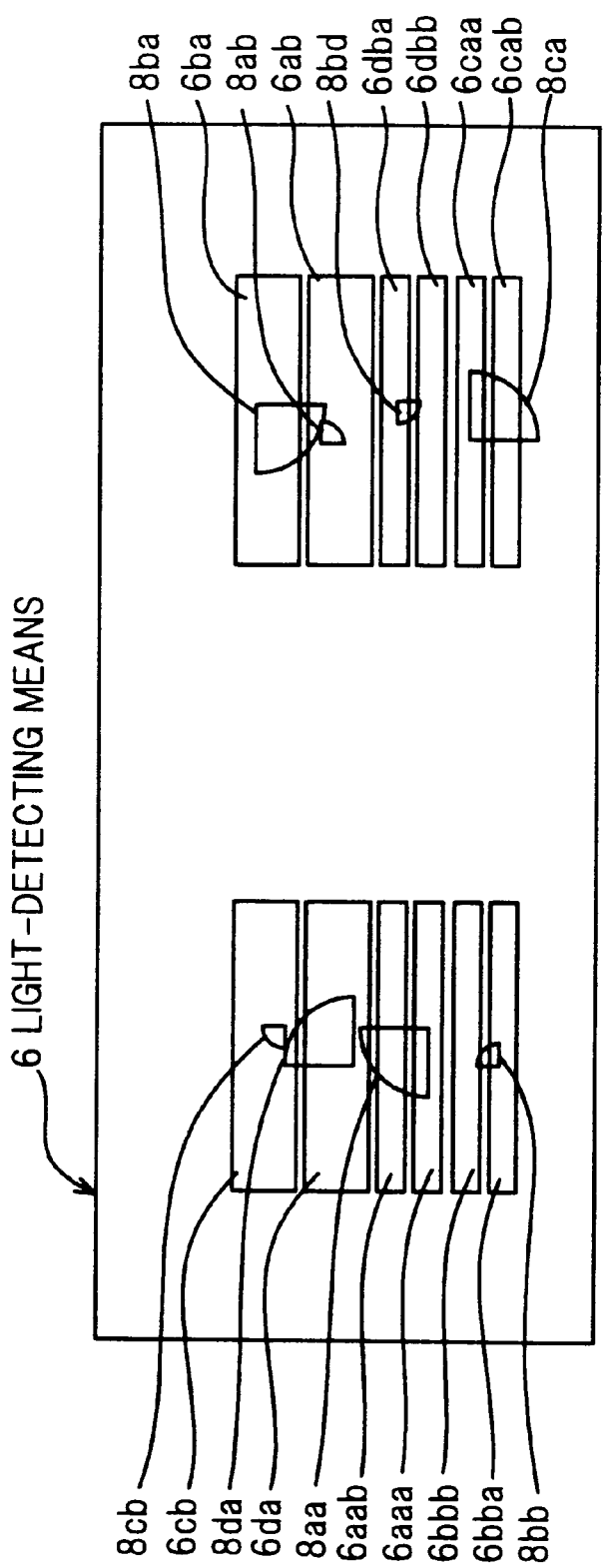

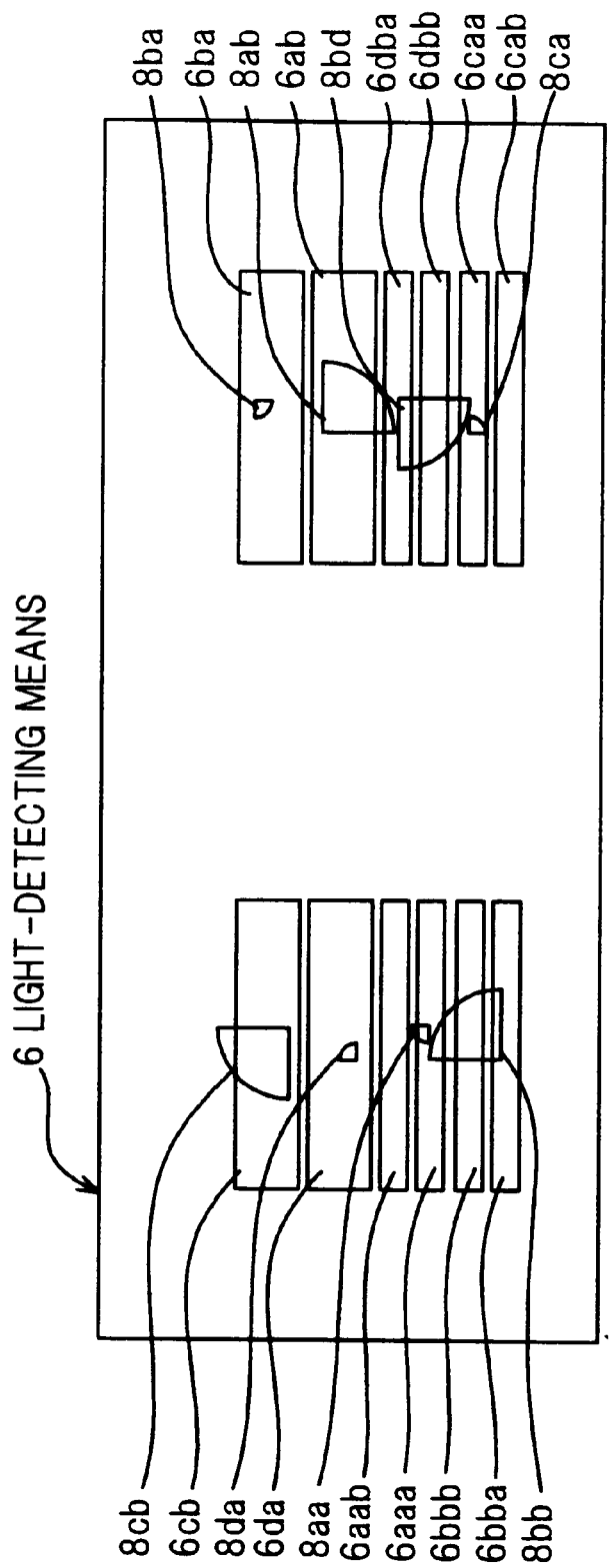

FOCUSING ERROR DETECTING EQUIPMENT

FIELD OF THE INVENTION

This invention relates to a focusing error detecting equipment, and more particularly to, a focusing error detecting equipment used in an optical device, such as an optical head and optical pickup.

BACKGROUND OF THE INVENTION

For example, a conventional focusing error detecting equipment is disclosed as an optical head device in Japanese patent application laid-open No. 63-229640 (1988) [first prior]. The optical system is shown in FIG. 1A. Light emitted from a light source 106 is transmitted through a diffraction grating beam splitter 107, converged upon a disk 109 by an objective lens 108. Then, the light reflected on the disk 109 is reversely passed through the same path, diffracted onto +1st-order diffracted light 107a and −1st-order diffracted light 107b by a diffraction grating beam splitter 107. The +1st-order diffracted light 107a is detected by a detector 110 while converging upon a focal point formed behind the detector 110, and the −1st-order diffracted light 107b is detected by a detector 111 while converging upon a focal point formed before the detector 111. As shown in FIG. 1B, the detector 110 is composed of light-receiving parts 110a, 110b and 110c which are parallel disposed, and the detector 111 is composed of light-receiving parts 111a, 111b and 111c which are parallel disposed. The +1st- order diffracted light 107a forms a beam spot 112a on the detector 110, and the −1st-order diffracted light forms a beam spot 112b on the detector 111.

The focal points of the +1st-order diffracted light 107a and −1st-order diffracted light 107b are moved before when the disk 109 goes away from the convergence point of the objective lens 108 due to a plane pitching etc. and are moved behind when the disk 109 comes close to the convergence point of the objective lens 108 due to a plane pitching etc. Namely, the beam spots 112a, 112b are reduced and enlarged, respectively when the disk 109 goes away from the convergence point of the objective lens 108 and, on the contrary, they are enlarged and reduced, respectively when the disk 109 comes close to the convergence point of the objective lens 108. Herein, provided that signals to be detected at light-receiving parts 110a to 110c are defined by signals T110a to T110c, respectively, a focusing error is detected by a focusing error signal G:

$$G=T110a-T110b+T110c-T111a+T111b-T111c.$$

Another conventional focusing error detecting device is disclosed as an optical head in T. Nagano et al., Proceedings of 12th Meeting on Lightwave Sensing Technology, LST 12–16, pp.103–109 [second prior art]. The optical system is shown in FIG. 2. Light emitted from a laser diode chip 101 is reflected on a mirror 102, transmitted through a holographic optical element 103, converged upon an optical disk by a lens (not shown) which is disposed in the direction of a z axis in FIG. 2. Then, the light reflected on the optical disk is reversely passed through the same path, diffracted by the holographic optical element 103, detected by a photodiode chip 104. The laser diode chip 101 is fixed through a heat sink 105 on the photodiode chip 104. The holographic optical element 103 is so fabricated that, when the optical disk is located at the convergence point of the lens, the light diffracted by the holographic optical element is converged upon the photodiode chip 104. Light diffracted at a region 103a to be formed of the holographic optical element 103 is converged upon a division line 104a which divides a light-receiving part 104aa and a light-receiving part 104ab on the photodiode chip 104, and light diffracted at a region 103b to be formed of the holographic optical element 103 diagonally against the region 103a is converged upon a division line 104b which divides a light-receiving part 104ba and a light-receiving part 104bb on the photodiode chip 104.

FIGS. 3A to 3C are plan views showing beam spots to be formed on the photodiode chip 104. FIG. 3A shows the case that the optical disk is far away from the convergence point of the lens. FIG. 3B shows the case that the optical disk is located at the convergence point of the lens. FIG. 3C shows the case that the optical disk is located before the convergence point of the lens. Herein, provided that signals to be detected at light-receiving parts 104aa to 104bb are defined by signals R104aa to R104bb, respectively, a focusing error is detected by a focusing error signal E:

$$E=R104aa-R104ab+R104ba-R104bb.$$

Meanwhile, the focusing error signal E has to be zero when the optical disk is located at the convergence point of the lens. However, there occurs an offset due to a fabrication error, a long-term variation etc. in the focusing error detecting equipment. For example, the focus offset occurs when a difference between the optical path length from the holographic optical element 103 to the laser diode chip 101 and the distance from the holographic optical element 103 to the photodiode chip 104 is out of a design value. In such a case, the light diffracted by the holographic optical element 103 forms beam spots as shown in FIGS. 3A and 3C even when the optical disk is located at the convergence point of the lens. In the conventional focusing error detecting equipment, the focusing offset has been removed by rotating the holographic optical element 103 around the z axis when the focusing offset exceeds a tolerance in the optical head.

In the first prior art, there is a problem that the reflected light on the disk 109 is not available for an use other than the focusing error detection without using a further component. For example, the tracking error detection, which is indispensable to an optical head, cannot be achieved without using a three-beam grating etc. Thus, it must be costly due to the addition of the component. Further, there is another problem that the focusing offset cannot be removed even by rotating the diffraction grating beam splitter 107 when the focusing offset to exceed a tolerance is caused by a fabrication error, a long-term variation etc. in the optical head.

In the second prior art, there is a problem that the focusing error detection sensitivity is highly reduced when the mirror 102 is shifted to the direction of the y axis to the photodiode chip 104 due to a fabrication error, a long-term variation etc. in the optical head. The reason why the focusing error detection sensitivity is reduced is as follows: In general, the focusing error detection sensitivity is high when the distance from the cross point of the optical axis of the light diffracted by the holographic optical element 103 and the photodiode chip 104 to the division line 104a or 104b is short or it is low when the distance is long. Namely, when the mirror 102 is shifted to the direction of the y axis to the photodiode chip 104, the cross point of the optical axis of the light diffracted by the region 103a of the holographic optical element 103 and the photodiode chip 104 goes away from the division line 104a, and the cross point of the optical axis of the light diffracted by the region 103b of the holographic optical element 103 and the photodiode chip 104 goes away from the division line 104b. On the other hand, the reason why the reduction of the focusing error detection sensitivity is large is as follows: When the focusing error detection is conducted in a far field, the ratio between the amounts of light to be distributed to the light-receiving parts 104aa, 104ab and the ratio between the amounts of light to be distributed to the light-receiving parts 104ba, 104bb are not so varied even when the beam spot is shifted to some extent. However, in this focusing error detecting equipment, these ratios are highly varied because its focusing error detection is conducted in a near field.

Furthermore, in the second prior art, there is a further problem that the focusing error detection sensitivity is highly reduced when the holographic optical element 103 is rotated around the z axis on the photodiode chip 104 due to a fabrication error, a long-term variation etc. in the optical head, or when the holographic optical element 103 is rotated around the z axis to remove the focusing offset. The reason why the focusing error detection sensitivity is reduced is as follows: In general, the focusing error detection sensitivity is high when the distance from the cross point of the optical axis of the light diffracted by the holographic optical element 103 and the photodiode chip 104 to the division line 104a or 104b is short or it is low when the distance is long. Namely, when the holographic optical element 103 is rotated around the z axis on the photodiode chip 104, the cross point of the optical axis of the light diffracted by the region 103a of the holographic optical element 103 and the photodiode chip 104 goes away from the division line 104a, and the cross point of the optical axis of the light diffracted by the region 130b of the holographic optical element 103 and the photodiode chip 104 goes away from the division line 104b. On the other hand, the reason why the reduction of the focusing error detection sensitivity is large is as follows: When the focusing error detection is conducted in a far field, the ratio between the amounts of light to be distributed to the light-receiving parts 104aa, *104ab* and the ratio between the amounts of light to be distributed to the light-receiving parts 104ba, 104bb are not so varied even when the beam spot is shifted to some extent. However, in this focusing error detecting equipment, these ratios are highly varied because its focusing error detection is conducted in a near field.

SUMMARY OF THE INVENTION

Accordingly, it is an object of the invention to provide a focusing error detecting equipment which light reflected on a focusing error detected object is also available for an use other than the focusing error detection.

It is a further object of the invention to provide a focusing error detecting equipment where a variation in focusing error detection sensitivity due to a fabrication error, a long-term variation etc. can be suppressed.

It is a still further object of the invention to provide a focusing error detecting equipment where a focusing offset due to a fabrication error, a long-term variation etc. can be removed.

According to the invention, a focusing error detecting equipment, comprises:

a light-generating means;

an image-forming means for converging light to be emitted from the light-generating means upon a focusing error detected object;

a diffraction element for diffracting light to be reflected on the focusing error detected object; and a light-detecting means for receiving lights to be separated by the diffraction element;

wherein the diffraction element is divided into four regions a, b, c and d by a boundary plane α and a boundary plane β, where the boundary plane α and boundary plane β are defined by two planes which include an optical axis of the reflected light from the focusing error detected object and are orthogonal to each other, the regions a and c to be located diagonally diffracting the reflected light into lights with a convergence point before the light-detecting means and the regions b and d to be located diagonally diffracting the reflected light into lights with a convergence point behind the light-detecting means, the light-detecting means comprises light-receiving parts ea and eb which are divided by a division line e parallel with the boundary plane α, light-receiving parts fa and fb which are divided by a division line f parallel with the boundary plane α, light-receiving parts ga and gb which are divided by a division line g parallel with the boundary plane α and light-receiving parts ha and ha which are divided by a division line h parallel with the boundary plane α, and a focusing error is detected by a focusing error signal, F obtained by:

$$F=Sea-Seb-Sfa+Sfb+Sga-Sgb-Sha+Shb$$

where signals Sea, Seb, Sfa, Sfb, Sga, Sgb, Sha and Shb are defined by signals to be detected at the light-receiving parts ea, eb, fa, fb, ga, gb, ha and hb, respectively when the diffracted lights from the regions a, b, c and d have optical axes to be passed through the light-receiving parts ea, fa, ga and ha, respectively and beam spots to be formed by the diffracted lights from the regions a, b, c and d are laid across the division lines e, f, g and h, respectively when the focusing error detected object is located at a convergence point of the image-forming means.

In this invention, without additional parts, light reflected on the focusing error detected object can be used for an use other than the focusing error detection as well as for detecting a focusing error because another light can be obtained from the reflected light. This is because, in the focusing error detecting equipment of the invention, the four regions of the diffraction element individually can generate either or both of +1st-order diffracted light and −1st-order diffracted light. Namely, when the four regions individually generate both +1st-order diffracted light and −1st-order diffracted light, the focusing error detection can be conducted by selecting one of the diffracted lights from the respective regions and a further detection other than the focusing error detection can be conducted by using the other diffracted light.

Further, in the focusing error detecting equipment of the invention, the focusing error detection sensitivity is almost not varied even when the light-generating means is shifted to the direction optically perpendicular to the division lines e, f, g and h of the light-detecting means in a plane perpendicular to the optical axis. Therefore, a variation in focusing error detection sensitivity due to a fabrication error or long-term variation can be prevented. In particular, even when the diffraction element is rotated to the light-detecting means in a plane perpendicular to the optical axis, the focusing error detection sensitivity is almost not varied since the light-detecting means is divided by the division lines e, f, g and h which are parallel with the boundary plane to separate the diffraction element into the four regions.

Still further, the focusing offset due to a fabrication error or long-term variation can be removed by rotating the diffraction element since the light-receiving parts divided by the division lines e, f, g and h are disposed on a predetermined region to be divided by the boundary plane.

BRIEF DESCRIPTION OF THE DRAWINGS

The invention will be explained in more detail in conjunction with the appended drawings, wherein:

FIGS. 6A to 6C are plan views showing beam spot formations on the light-detecting means in FIG. 5B depending upon the state of focusing.

DESCRIPTION OF THE PREFERRED EMBODIMENTS

Figure 1A:
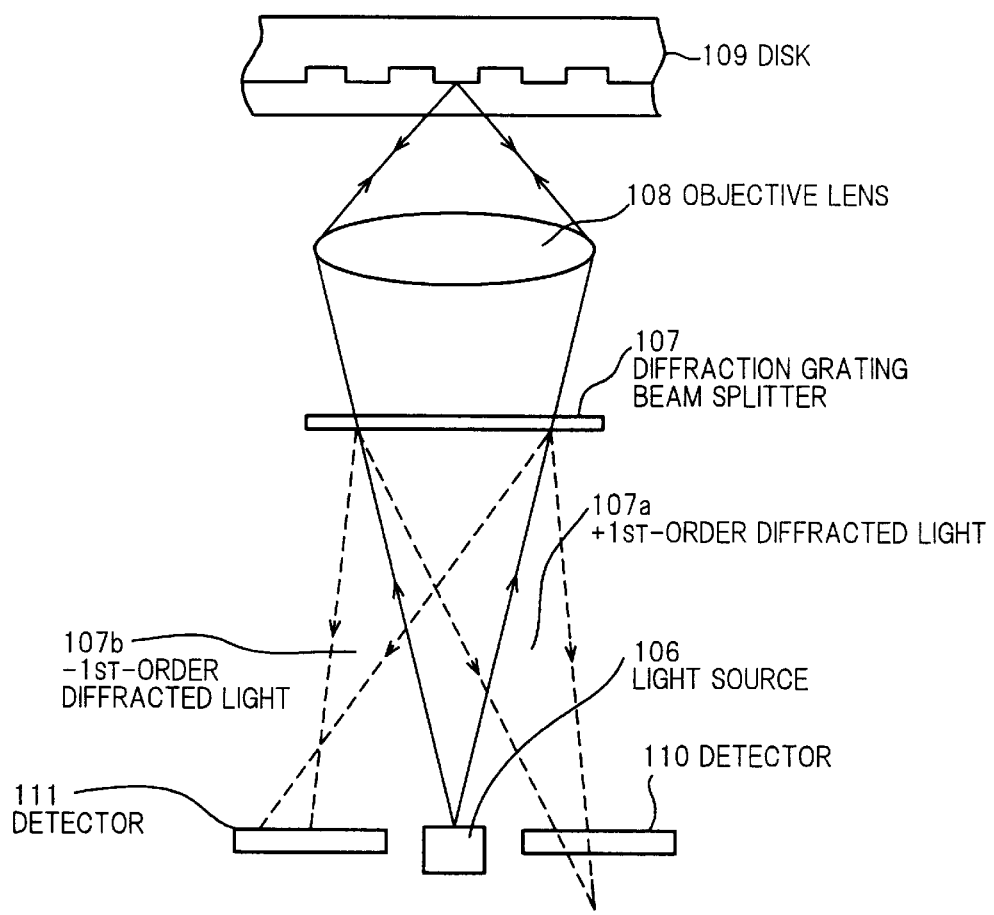
FIG. 1A is a front view showing a conventional focusing error detecting equipment.
Figure 1B:
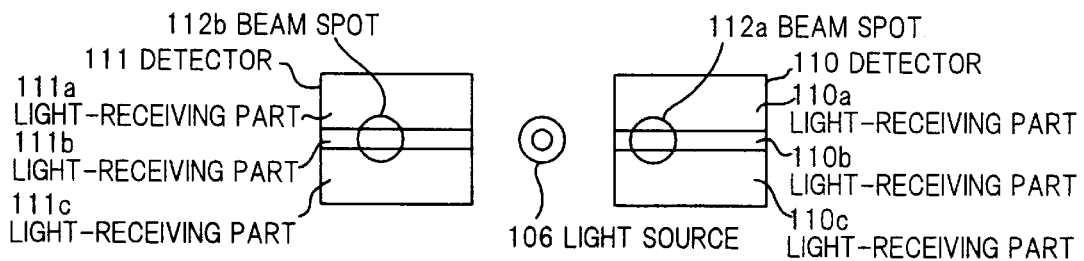
FIG. 1B is a plan view showing a light source and a detector in FIG. 1A.
Figure 2:
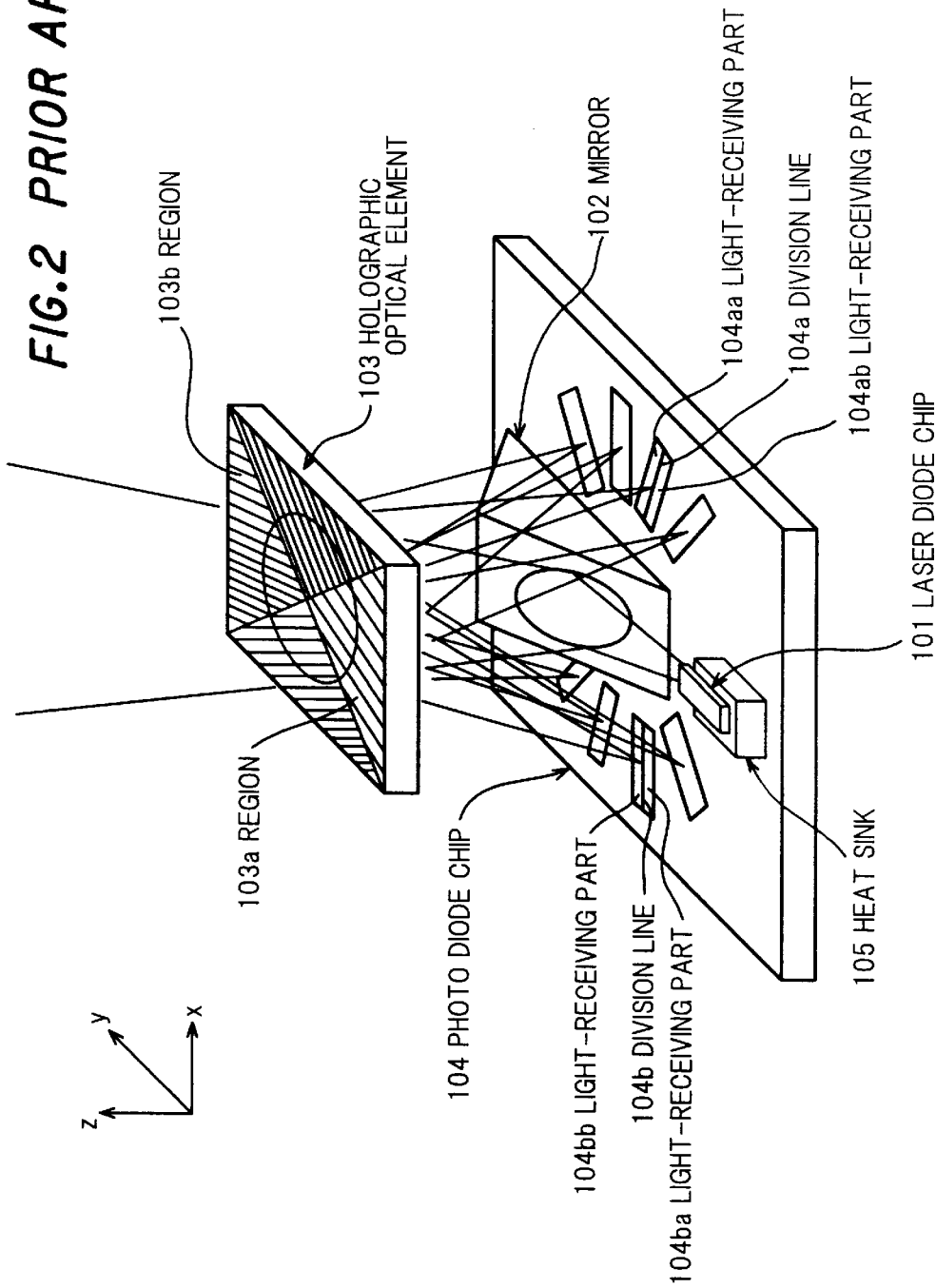
FIG. 2 is a perspective view showing another conventional focusing error detecting equipment.
Figure 3A:
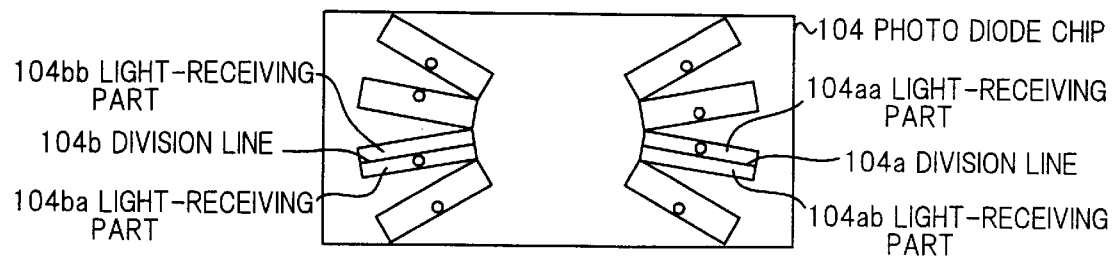
FIGS. 3A to 3C are plan views showing a light-detecting means in FIG. 2.
Figure 3B:
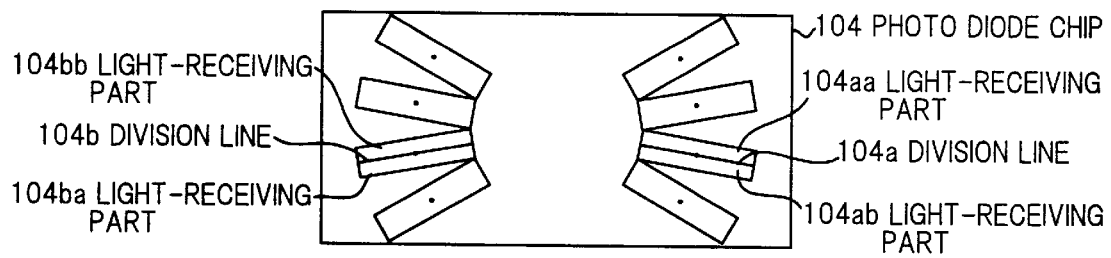
Figure 3C:
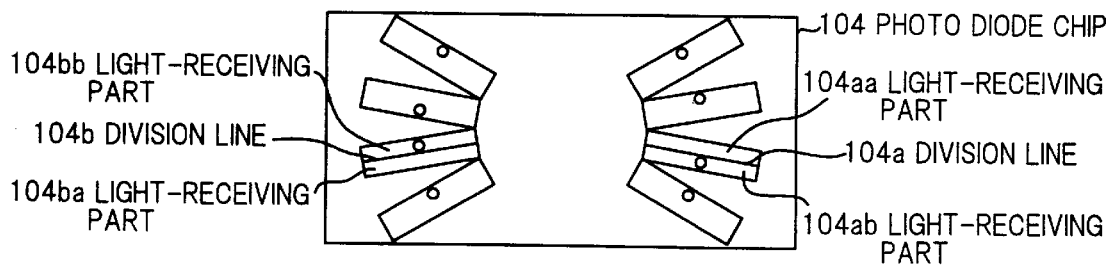
Figure 4:
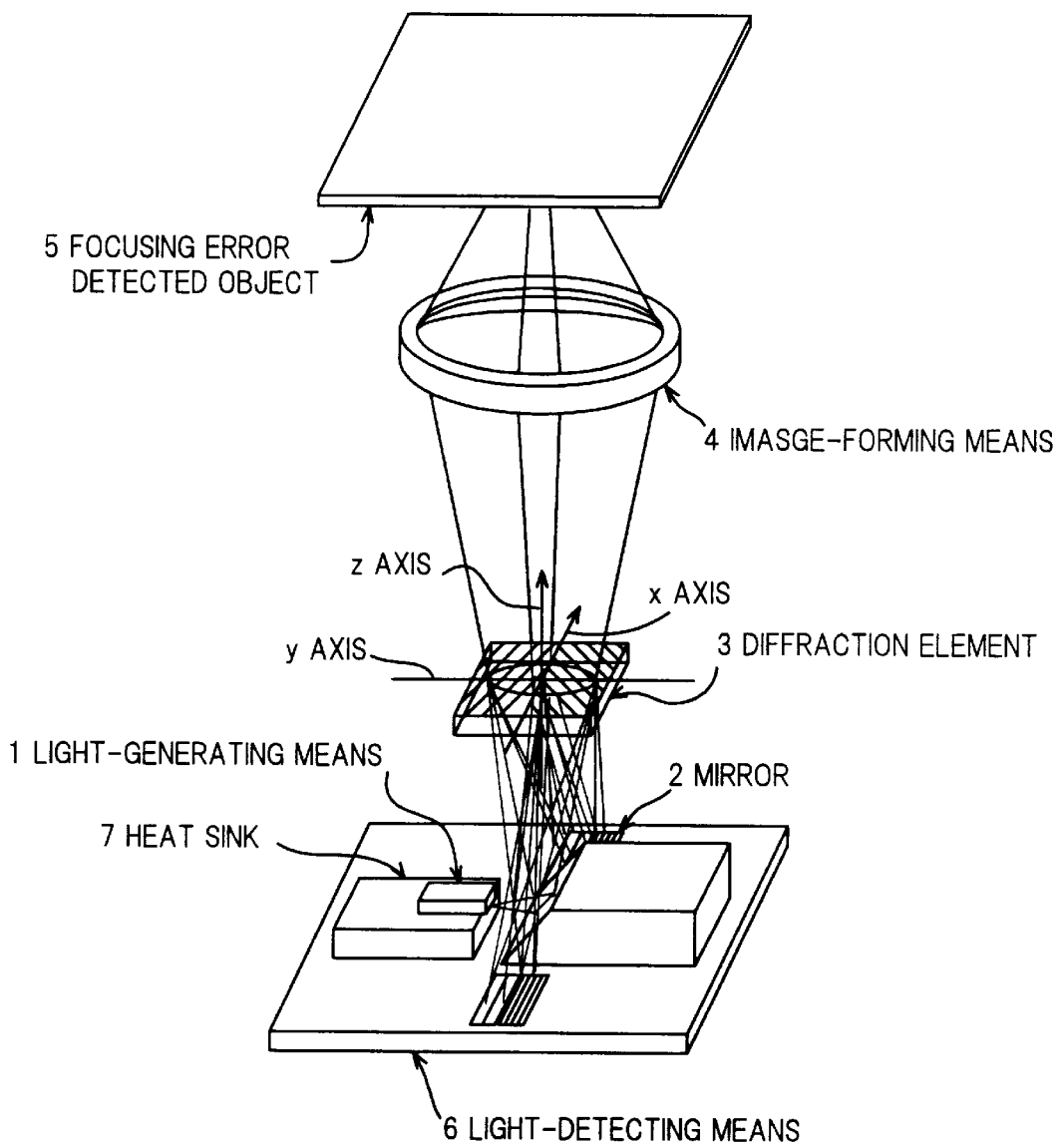
FIG. 4 is a perspective view showing a focusing error detecting equipment in a first preferred embodiment according to the invention.

A focusing error detecting equipment in the first preferred embodiment will be explained in FIG. 4. Light emitted from a light-generating means 1, such as a semiconductor laser is reflected in the right-angled direction on a mirror 2 with a reflecting plane declined to the optical axis, transmitted through a diffraction element 3, converged upon a focusing error detected object 5, such as an optical disk by an image-forming means 4, such as an objective lens. The light reflected on the focusing error detected object 5 is reversely passed through the same optical path, diffracted by the diffraction element 3, detected by a light-detecting means 6, such as a photodiode chip. The light-generating means 1 is fixed through a heat sink 7 on the light-detecting means 6.

Figure 5A:
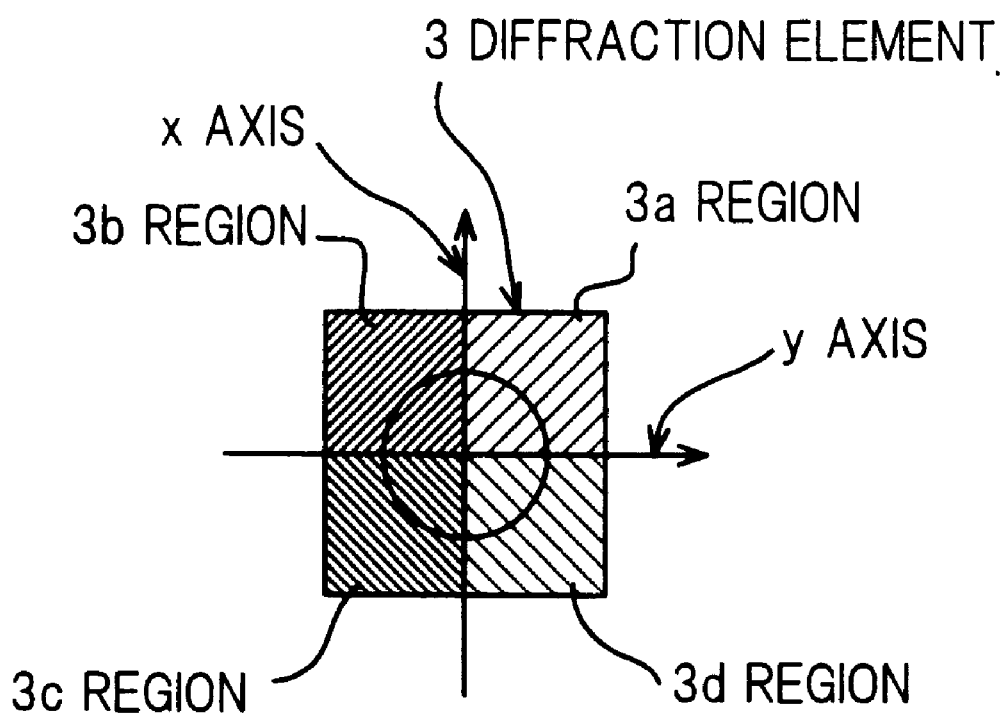
FIGS. 5A and 5B are plan views showing a diffraction element and a light-detecting means, respectively in the first embodiment.
Figure 5B:
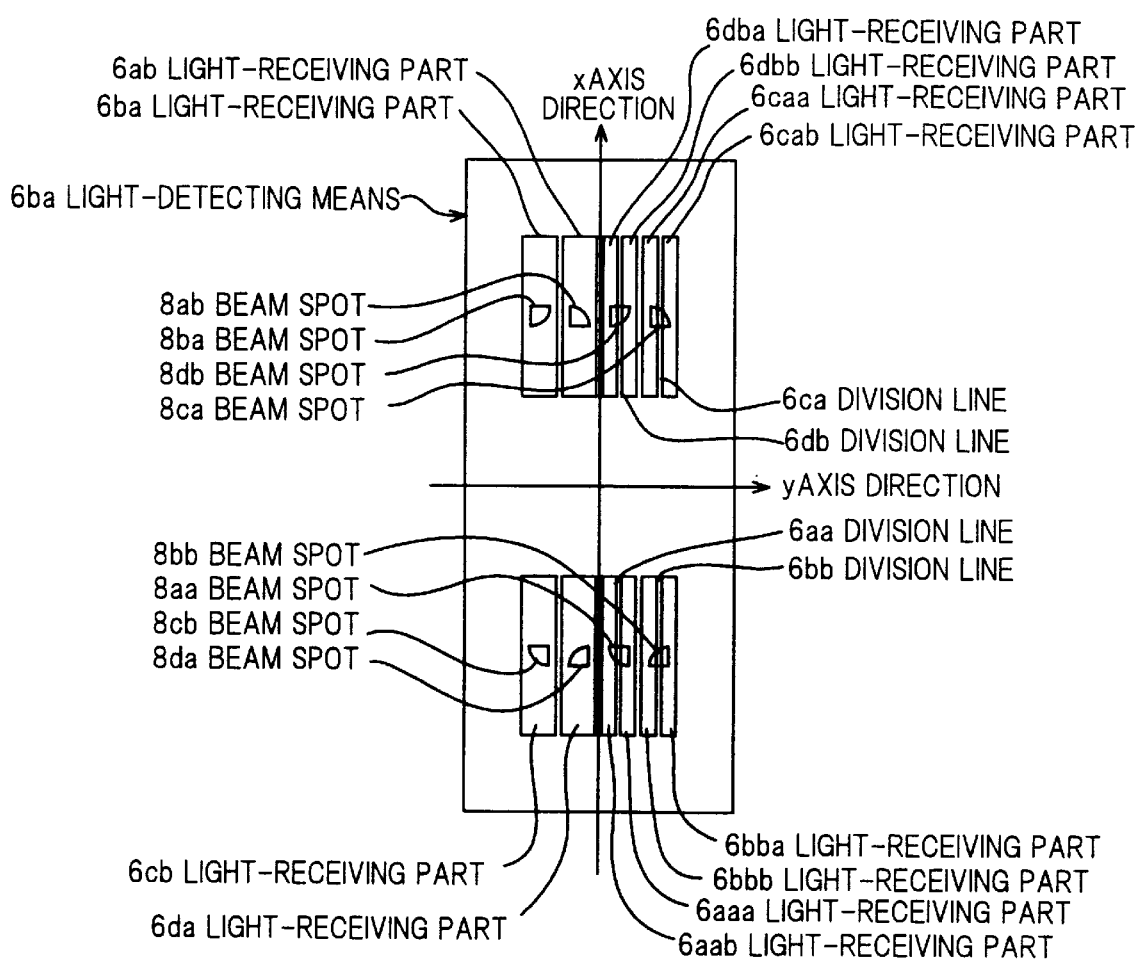

FIG. 5A is a plan view showing the diffraction element 3, and FIG. 5B is a plan view showing the light-detecting means 6. The diffraction element 3 generates +1st-order diffracted light to be converged before the light-detecting means 6 and −1st-order diffracted light to be converged behind the light-detecting means 6 when the focusing error detected object 5 is located at the convergence point of the image-forming means 4. The diffraction element 3 is divided into four regions 3a to 3d by x and y axes. Light diffracted by the region 3a forms beam spots 8aa, 8ab on the light-detecting means 6, light diffracted by the region 3b forms beam spots 8ba, 8bb on the light-detecting means 6, light-diffracted by the region 3c forms beam spots 8ca, 8cb on the light-detecting means 6, and light diffracted by the region 3d forms beam spots 8da, 8db on the light-detecting means 6. The beam spots 8aa, 8ba, 8ca and 8da are beam spots to be formed by +1st-order diffracted light, and the beam spots 8ab, 8bb, 8cb and 8db are beam spots to be formed by −1st-order diffracted light.

Also, the beam spots 8aa is photoelectric-converted at light-receiving parts 6aaa, 6aab of the light-detecting means 6, the beam spot 8bb is photoelectric-converted at light-receiving parts 6bba, 6bbb of the light-detecting means 6, the beam spot 8ca is photoelectric-converted at light-receiving parts 6caa, 6cab of the light-detecting means 6, the beam spot 8db is photoelectric-converted at light-receiving parts 6dba, 6dbb of the light-detecting means 6, the beam spot 8ab is photoelectric-converted at a light-receiving part 6ab of the light-detecting means 6, the beam spot 8ba is photoelectric-converted at a light-receiving part 6ba of the light-detecting means 6, the beam spot 8cb is photoelectric-converted at a light-receiving part 6cb of the light-detecting means 6, the beam spot 8da is photoelectric-converted at a light-receiving part 6da of the light-detecting means 6.

Figure 6B:
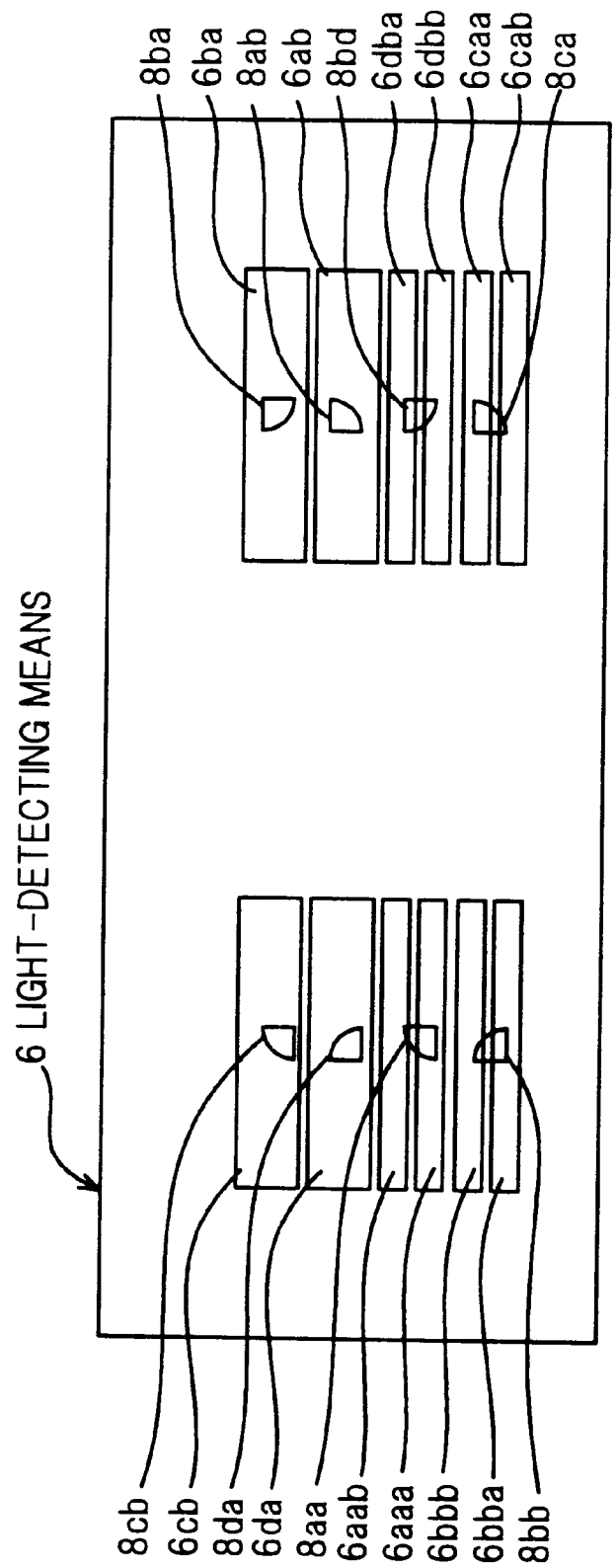

Here, provided that points upon which +1st-order diffracted lights from the regions 3a, 3b, 3c and 3d are converged when the focusing error detected object 5 is located at the convergence point of the image-forming means 4 are defined by points P3a, P3b, P3c and P3d, respectively, interference fringes which appear at the respective regions 3a, 3b, 3c and 3d when point light sources are placed at a light-emitting point of the light-generating means 1 and the respective points P3a, P3b, P3c and P3d are recorded on the regions 3*a*, 3*b*, 3*c* and 3*d* of the diffraction element 3. FIGS. 6A to 6C are plan views showing the beam spots 8*aa* to 8*db* formed on the light-detecting means 6. FIG. 6A shows the case that the focusing error detected object 5 is located behind the convergence point of the image-forming means 4, FIG. 6B shows the case that the focusing error detected object 5 is located before the convergence point of the image-forming means 4, and FIG. 6C shows the case that the focusing error detected object 5 is located before the convergence point of the image-forming means 4. Herein, provided that signals to be detected at the light-receiving parts 6*aaa* to 6*dbb* are defined by signals S6*aaa* to S6*dbb*, respectively, a focusing error is detected by a focusing error signal F1, which has the following relation which the signals S6*aaa* to S6*dbb*:

F1=S6aaa−S6aab−S6bba+S6bbb+S6caa−S6cab−S6dba+S6dbb.

For example, when the focusing error detected object 5 is an optical disk, optical card or the like on which tracks or pit lines are formed, by positioning the tracks or pit lines of the focusing error detected object 5 to be parallel with the x or y axis, a tracking error is detected by tracking error signals T1, T2, which have the following relations with the signals S6*ab* to S6*da*. Also, by positioning the tracks or pit lines of the focusing error detected object 5 to be parallel with the y axis, a tracking error is detected by a tracking error signal T3. Further, by positioning the tracks or pit lines of the focusing error detected object 5 to be parallel with the x axis, a tracking error is detected by a tracking error signal T4.

1) When servomechanism by the eterodyne detection method is used,

T1=|A difference between the amplitude of (S6*ab*−S6*ba*+S6*cb*−S6*da*) to be retained when (S6*ab*+S6*ba*+S6*cb*+S6*da*) has a zero-cross rising and the amplitude of (S6*ab*−S6*ba*+S6*cb*−S6*da*) to be retained when (S6*ab*+S6*ba*+S6*cb*+S6*da*) has a zero-cross rising|

2) When servomechanism by the differential time detection method or the differential phase detection method is used.

T2=|the amplitude conversion value of a time difference or phase difference between (S6*ab*+S6*cb*) and (S6*ba*+S6*da*)|

3) When servomechanism by the push-pull method is used,

T3=S6ab+S6ba−S6cb−S6da,

T4=S6ab−S6ba−S6cb+S6da.

Meanwhile, when a tracking error is detected by the tracking error signal T3, the neighboring light-receiving parts 6*ab*, 6*ba* can be unified into one light-receiving part and the neighboring light-receiving parts 6*cb*, 6*da* can be unified into one light-receiving part. Thereby, the number of light-receiving parts decrease, the number of wirings can be reduced, and the material cost and fabrication steps can be therefore reduced, thereby improving the production yield. When a tracking error is detected by the tracking error signal T4, the tracking error signal may mix into the focusing error signal.

Also, in this composition, even when the light-generating means 1 is shifted to the direction of the z axis or even when the mirror 2 is shifted to the direction of the y axis to the light-detecting means 6, the cross point of the optical axis of the light diffracted by the region 3*a* of the diffraction element 3 and the light-detecting means 6 goes away from (or, on the contrary, comes close to) a division line 6*aa*, the cross point of the optical axis of the light diffracted by the region 3*b* of the diffraction element 3 and the light-detecting means 6 goes away from (or on the contrary, comes close to) a division line 6*bb*, the cross point of the optical axis of the light diffracted by the region 3*c* of the diffraction element 3 and the light-detecting means 6 comes close to (or, on the contrary, goes away from) a division line 6*ca*, and the cross point of the optical axis of the light diffracted by the region 3*d* of the diffraction element 3 and the light-detecting means 6 comes close to (or, on the contrary, goes away from) a division line 6*db*. Thus, the increment and decrement of the focusing error detection sensitivities cancel. Furthermore, by detecting the focusing error in a far field, the focusing error detection sensitivity is almost not varied.

On the other hand, even when the light-generating means 1 is shifted to the direction of the z axis or even when the mirror 2 is shifted to the direction of the y axis to the light-detecting means 6 or even when the diffraction element 3 is rotated to the light-detecting means 6, when the focusing error detected object 5 is located at the convergence point of the image-forming means 4, an area where the beam spot 8*aa* is supplied to the light-receiving part 6*aaa* (an area where the beam spot 8*aa* is supplied to the light-receiving part 6*aab*) is equal to an area where the beam spot 8*bb* is supplied to the light-receiving part 6*bba* (an area where the beam spot 8*bb* is supplied to the light-receiving part 6*bbb*), and an area where the beam spot 8*ca* is supplied to the light-receiving part 6*cab* (an area where the beam spot 8*ca* is supplied to the light-receiving part 6*caa*) is equal to an area where the beam spot 8*db* is supplied to the light-receiving part 6*dbb* (an area where the beam spot 8*db* is supplied to the light-receiving part 6*dba*). Therefore, no focusing offset occurs.

In the focusing error detection, used are diffracted lights which have a convergence point before the light-detecting means 6 and a convergence point behind the light-detecting means 6, respectively when the focusing error detected object 5 is located at the convergence point of the image-forming means 4. Here, the regions 3*a* and 3*c* to generate diffracted light with the convergence point before the light-detecting means 6 are located diagonally, and the regions 3*b* and 3*d* to generate diffracted light with the convergence point behind the light-detecting means 6 are located diagonally. Therefore, even when the diffraction element 3 is shifted to the direction of the x or y axis, there occurs no focusing offset.

Figure 7:
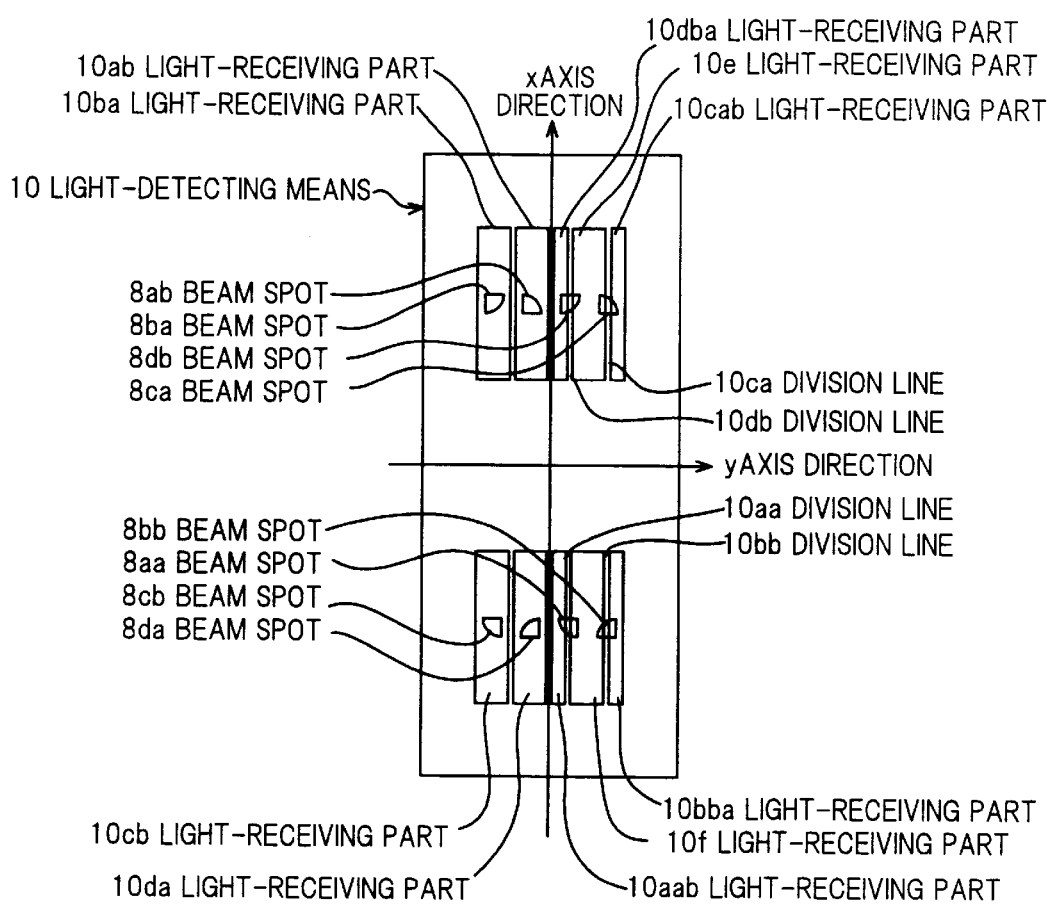
FIG. 7 is a plan view showing a light-detecting means of a focusing error detecting equipment in a second preferred embodiment according to the invention.

A focusing error detecting equipment in the second preferred embodiment will be explained in FIG. 7. In the second embodiment, the light-detecting means 6 in the first embodiment is replaced by a light-detecting means 10. FIG. 7 is a plan view showing the light-detecting means 10. The beam spot 8*aa* is photoelectric-converted at a light-receiving part 10*f* and a light-receiving part 10*aab* of the light-detecting means 10, the beam spot 8*bb* is photoelectric-converted at a light-receiving part 10*bba* and the light-receiving part 10*f* of the light-detecting means 10, the beam spot 8*ca* is photoelectric-converted at a light-receiving part 10*e* and a light-receiving part 10*cab* of the light-detecting means 10, the beam spot 8*db* is photoelectric-converted at a light-receiving part 10*dba* and the light-receiving part 10*e* of the light-detecting means 10, the beam spot 8*ab* is photoelectric-converted at a light-receiving part 10*ab* of the light-detecting means 10, the beam spot 8*ba* is photoelectric-converted at a light-receiving part 10*ba* of the light-detecting means 10, the beam spot 8*cb* is photoelectric-converted at a light-receiving part 10*cb* of the light-detecting means 10, and the beam spot 8*db* is photoelectric-converted at a light-receiving part 10*da* of the light-detecting means 10. Herein, provided that signals to be detected at the light-receiving parts 10*aab* to 10*f* are defined by signals S10*aab* to S10*f*, respectively, a focusing error is detected by a focusing error signal F2, which has the following relation with the signals S10*aab* to S10*f*:

$$F2=S10f-S10aab-S10bba+S10e-S10cab-S10dba.$$

For example, when the focusing error detected object 5 is an optical disk, optical card or the like on which tracks or pit lines are formed, by positioning the tracks or pit lines of the focusing error detected object 5 to be parallel with the x or y axis, a tracking error is detected like the first embodiment, by using the signals S10*ab* to S10*da*. Namely, the tracking error can be detected by replacing the signal S6*ab* with the signal S10*ab*, replacing the signal S6*ba* with the signal S10*ba*, replacing the signal 6*cb* with the S10*cb* and replacing the signal S6*da* with the signal S10*da*.

In the second embodiment, the number of light-receiving parts the number of wirings can be reduced, and the material cost and fabrication steps can be therefore reduced, thereby improving the production yield, as well as having the advantages in the first embodiment that the focusing error detection sensitivity is almost not varied and no focusing offset occurs.

Figure 8A:
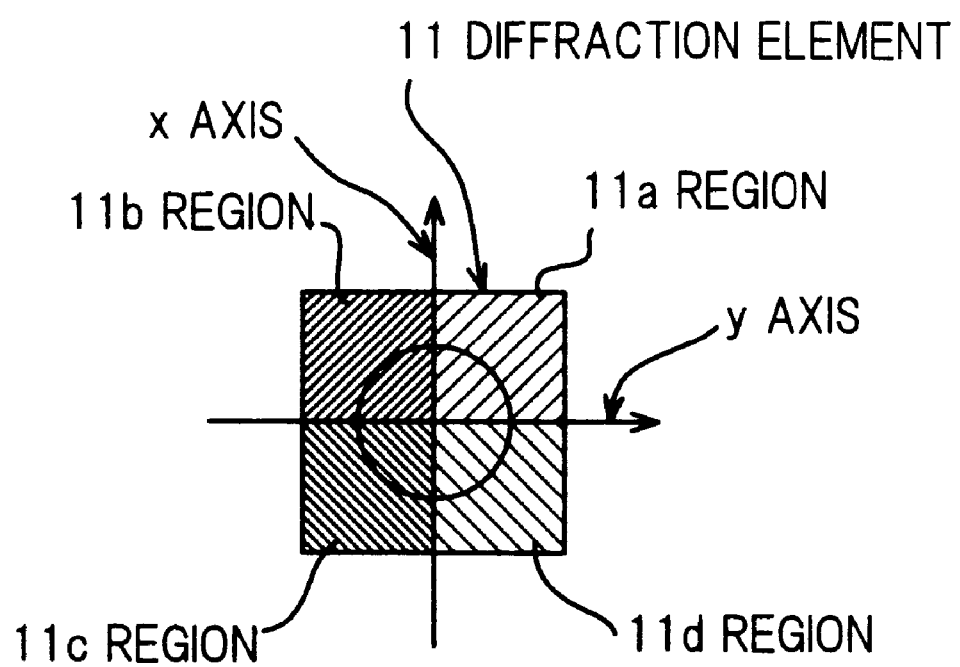
FIGS. 8A and 8B are plan views showing a diffraction element and a light-detecting means, respectively of a focusing error detecting equipment in a third preferred embodiment according to the invention.
Figure 8B:
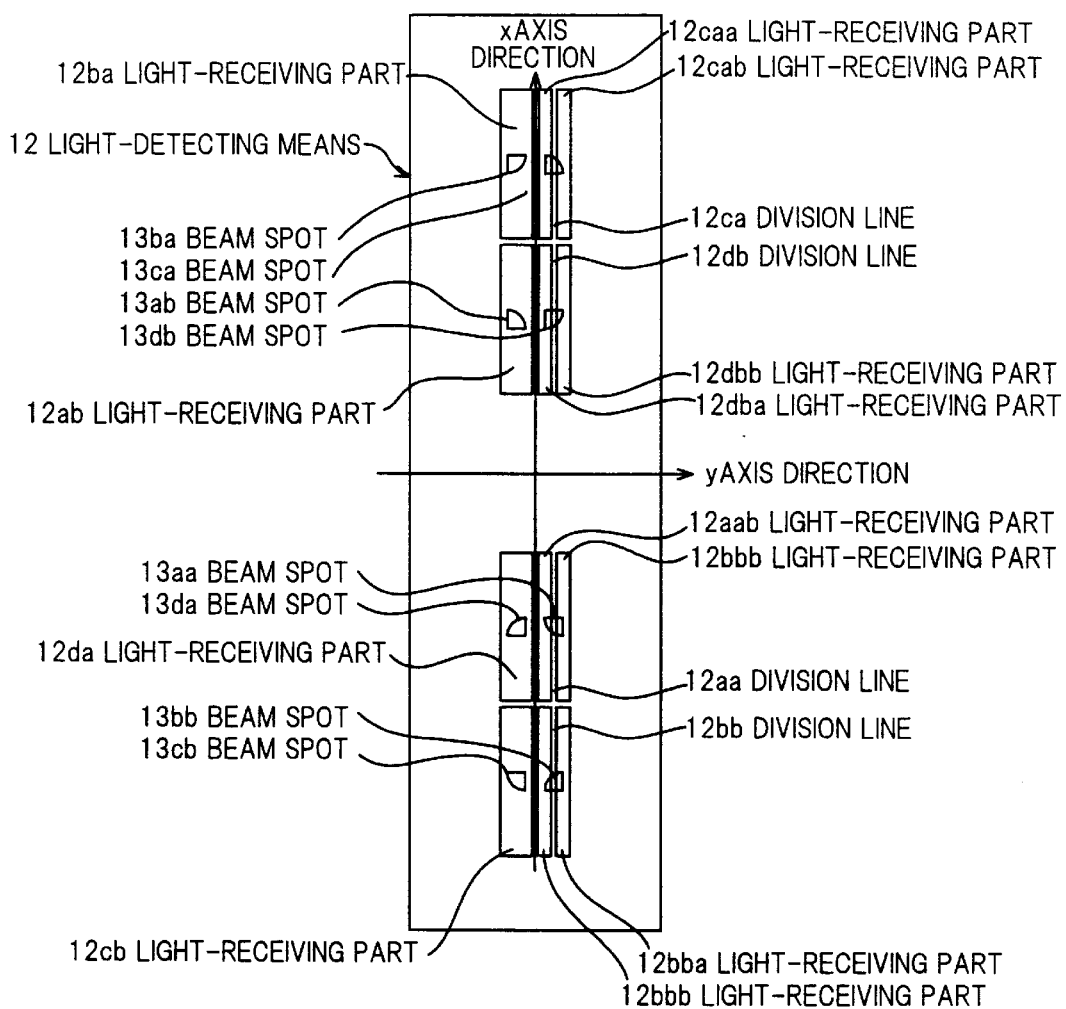

A focusing error detecting equipment in the third preferred embodiment will be explained in FIGS. 8A and 8B. In the third embodiment, the diffraction element 3 in the first embodiment is replaced by a diffraction element 11 and the light-detecting means 6 in the first embodiment is replaced by a light-detecting means 12. FIG. 8A is a plan view showing the diffraction element 11 and FIG. 8B is a plan view showing the light-detecting means 12. The diffraction element 11 generates +1st-order diffracted light to be converged before the light-detecting means 12 and −1st-order diffracted light to be converged behind the light-detecting means 12 when the focusing error detected object 5 is located at the convergence point of the image-forming means 4. The diffraction element 11 is divided into four regions 11*a* to 11*d* by x and y axes. Light diffracted by the region 11*a* forms beam spots 13*aa*, 13*ab* on the light-detecting means 12, light diffracted by the region 11*b* forms beam spots 13*ba*, 13*bb* on the light-detecting means 12, light diffracted by the region 11*c* forms beam spots 13*ca*, 13*cb* on the light-detecting means 12, and light diffracted by the region 11*d* forms beam spots 13*da*, 13*db* on the light-detecting means 12. The beam spots 13*aa*, 13*ba*, 13*ca* and 13*da* are beam spots to be formed by +1st-order diffracted light, and the beam spots 13*ab*, 13*bb*, 13*cb* and 13*cb* are beam spots to be formed by −1st-order diffracted light.

Also, the beam spot 13*aa* is photoelectric-converted at light-receiving parts 12*aaa*, 12*aab* of the light-detecting means 12, the beam spot 13*bb* is photoelectric-converted at light-receiving parts 12*bba*, 12*bbb* of the light-detecting means 12, the beam spot 13*ca* is photoelectric-converted at light-receiving parts 12*caa*, 12*cab* of the light-detecting means 12, the beam spot 13*db* is photoelectric-converted at light-receiving parts 12*dba*, 12*dbb* of the light-detecting means 12, the beam spot 13*ab* is photoelectric-converted at a light-receiving part 12*ab* of the light-detecting means 12, the beam spot 13*ba* is photoelectric-converted at a light-receiving part 12*ba* of the light-detecting means 12, the beam spot 13*cb* is photoelectric-converted at a light-receiving part 12*cb* of the light-detecting means 12, and the beam spot 13*da* is photoelectric-converted at a light-receiving part 12*da* of the light-detecting means 12. Herein, provided that signals to be detected at the light-receiving parts 12*aaa* to 12*dbb* are defined by signals S12*aaa* to S12*dbb*, respectively, a focusing error is detected by a focusing error signal F3, which has the following relation with the signals S12*aaa* to S12*dbb*:

$$F3=S12aaa-S12aab-S12bba+S12bbb+S12caa-S12cab-S12dba+S12dbb.$$

Here, provided that points upon which +1st-order diffracted lights from the regions 11*a*, 11*b*, 11*c* and 11*d* are converged when the focusing error detected object 5 is located at the convergence point of the image-forming means 4 are defined by points P11*a*, P11*b*, P11*c* and P11*d*, respectively, interference fringes which appear at the respective regions 11*a*, 11*b*, 11*c* and 11*d* when point light sources are placed at a light-emitting point of the light-generating means 1 and the respective points P11*a*, P11*b*, P11*c* and P11*d* are recorded on the regions 11*a*, 11*b*, 11*c* and 11*d* of the diffraction element 11.

For example, when the focusing error detected object 5 is an optical disk, optical card or the like on which tracks or pit lines are formed, by positioning the tracks or pit lines of the focusing error detected object 5 to be parallel with the x or y axis, a tracking error is detected like the first embodiment, by using the signals S12*ab* to S12*da*. Namely, the tracking error can be detected by replacing the signal S6*ab* with the signal S12*ab*, replacing the signal S6*ba* with the signal S12*ba*, replacing the signal 6*cb* with the S12*cb* and replacing the signal S6*da* with the signal S12*da*.

In the third embodiment, the arrangement of light-receiving parts in the first embodiment is changed while having the advantages in the first embodiment that the focusing error detection sensitivity is almost not varied and no focusing offset occurs. Namely, it is proved that the invention is not limited to the arrangement of light-receiving parts.

Figure 9A:
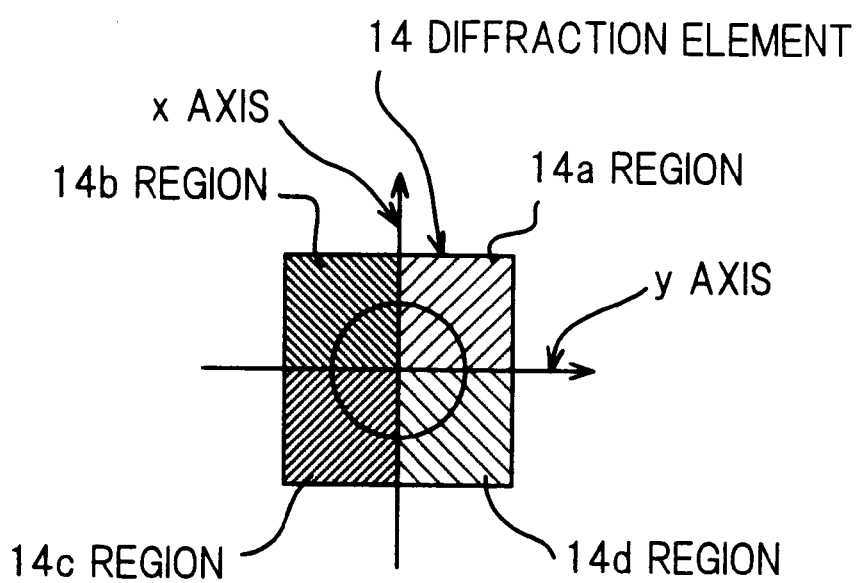
FIGS. 9A and 9B are plan views showing a diffraction element and a light-detecting means, respectively of a focusing error detecting equipment in a fourth preferred embodiment according to the invention.
Figure 9B:
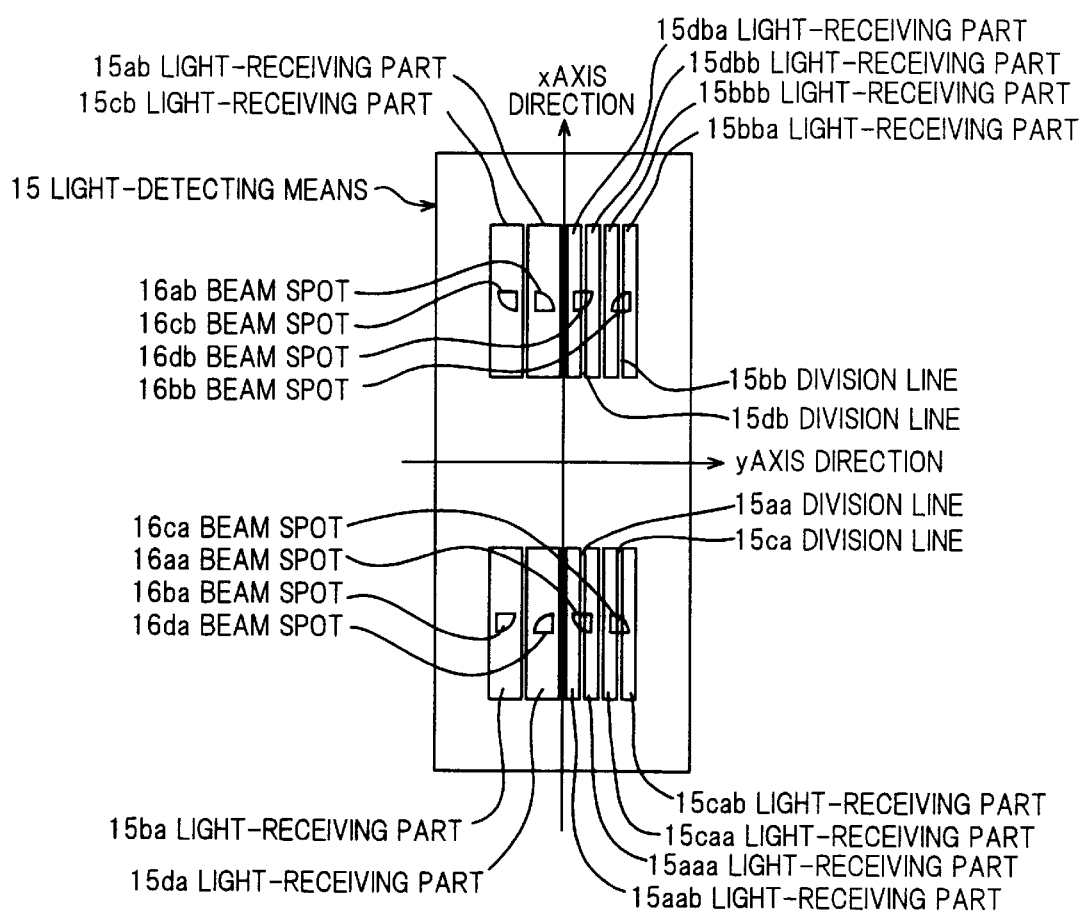

A focusing error detecting equipment in the fourth preferred embodiment will be explained in FIGS. 9A and 9B. In the fourth embodiment, the diffraction element 3 in the first embodiment is replaced by a diffraction element 14 and the light-detecting means 6 in the first embodiment is replaced by a light-detecting means 15. FIG. 9A is a plan view showing the diffraction element 14 and FIG. 9B is a plan view showing the light-detecting means 15. The diffraction element 14 generates +1st-order diffracted light to be converged before the light-detecting means 15 and −1st-order diffracted light to be converged behind the light-detecting means 15 when the focusing error detected object 5 is located at the convergence point of the image-forming means 4. The diffraction element 14 is divided into four regions 14*a* to 14*d* by x and y axes. Light diffracted by the region 14*a* forms beam spots 16*aa*, 16*ab* on the light-detecting means 15, light diffracted by the region 14*b* forms beam spots 16*ba*, 16*bb* on the light-detecting means 15, light diffracted by the region 14*c* forms beam spots 16*ca*, 16*cb* on the light-detecting means 15, and light diffracted by the region 14*d* forms beam spots 16*da*, 16*db* on the light-detecting means 15. The beam spots 16*aa*, 16*ba*, 16*ca* and 16*da* are beam spots to be formed by +1st-order diffracted light, and the beam spots 16*ab*, 16*bb*, 16*cb* and 16*db* are beam spots to be formed by −1st-order diffracted light.

Also, the beam spot 16*aa* is photoelectric-converted at light-receiving parts 15*aaa*, 15*aab* of the light-detecting means 15, the beam spot 16*bb* is photoelectric-converted at light-receiving parts 15*bba*, 15*bbb* of the light-detecting means 15, the beam spot 16*ca* is photoelectric-converted at light-receiving parts 15*caa*, 15*cab* of the light-detecting means 15, the beam spot 16db is photoelectric-converted at light-receiving parts 15dba, 15dbb of the light-detecting means 15, the beam spot 16ab is photoelectric-converted at a light-receiving part 15ab of the light-detecting means 15, the beam spot 16ba is photoelectric-converted at a light-receiving part 15ba of the light-detecting means 15, the beam spot 16cb is photoelectric-converted at a light-receiving part 15cb of the light-detecting means 15, and the beam spot 16da is photoelectric-converted at a light-receiving part 15da of the light-detecting means 15. Herein, provided that signals to be detected at the light-receiving parts 15aaa to 15dbb are defined by signals S15aaa to S15dbb, respectively, a focusing error is detected by a focusing error signal F4, which has the following relation with the signals S15aaa to S15dbb:

$$F4=S15aaa-S15aab-S15bba+S15bbb+S15caa-S15cab-S15dba+S15dbb.$$

Also, provided that points upon which +1st-order diffracted lights from the regions 14a, 14b, 14c and 14d are converged when the focusing error detected object 5 is located at the convergence point of the image-forming means 4 are defined by points P14a, P14b, P14c and P14d, respectively, interference fringes which appear at the respective regions 14a, 14b, 14c and 14d when point light sources are placed at a light-emitting point of the light-generating means 1 and the respective points P14a, P14b, P14c and P14d are recorded on the regions 14a, 14b, 14c and 14d of the diffraction element 14.

For example, when the focusing error detected object 5 is an optical disk, optical card or the like on which tracks or pit lines are formed, by positioning the tracks or pit lines of the focusing error detected object 5 to be parallel with the x or y axis, a tracking error is detected by tracking error signals T5, T6, which have the following relations with the signals S15ab to S15da. Also, by positioning the tracks or pit lines of the focusing error detected object 5 to be parallel with the y axis, a tracking error is detected by a tracking error signal T7. Further, by positioning the tracks or pit lines of the focusing error detected object 5 to be parallel with the x axis, a tracking error is detected by a tracking error signal T8.

1) When a servomechanism by the heterodyne detection is used,

T5=|a difference between the amplitude of (S15ab−S15ba+S15cb−S15da) to be retained when (S15ab+S15ba+S15db+S15da) has a zero-cross rising and the amplitude of (S15ab−S15ba+S15cb−S15da) to be retained when (S15ab+S15ba+S15cb+S15da) has a zero-cross rising|

2) When servomechanism by the differential time detection method or the differential phase detection method is used, T6=|the amplitude conversion value of a time difference or phase difference between (S15ab+S15cb) and (S15ba+S15da)|

3) When servomechanism by the push-pull method is used, $$T7=S15ab+S15ba-S15cb-S15da,$$

$$T8=S15ab-S15ba-S15cb+S15da.$$

Meanwhile, when a tracking error is detected by the tracking error signals T5 and T6, the neighboring light-receiving parts 15ab, 15cb can be unified into one light-receiving part and the neighboring light-receiving parts 15ba, 15da can be unified into one light-receiving part. Thereby, the number of light-receiving parts decrease, the number of wirings can be reduced, and the material cost and fabrication steps can be therefore reduced, thereby improving the production yield. When a tracking error is detected by the tracking error signal T8, the tracking error signal may mix into the focusing error signal.

Also, in this composition, even when the light-generating means 1 is shifted to the direction of the z axis or even when the mirror 2 is shifted to the direction of the y axis to the light-detecting means 15, the cross point of the optical axis of the light diffracted by the region 14a of the diffraction element 14 and the light-detecting means 15 goes away from (or, on the contrary, comes close to) a division line 15aa, the cross point of the optical axis of the light-diffracted by the region 14b of the diffraction element 14 and the light-detected means 15 goes away from (or, on the contrary, comes close to) a division line 15bb, the cross point of the optical axis of the light diffracted by the region 14c of the diffraction element 14 and the light-detecting means 15 comes close to (or, on the contrary, goes away from) a division line 15ca, and the cross point of the optical axis of the light diffracted by the region 14d of the diffraction element 14 and the light-detecting means 15 comes close to (or, on the contrary, goes away from) a division line 15db. Thus, the increment and decrement of the focusing error detection sensitivities cancel. Furthermore, by detecting the focusing error in a far field, the focusing error detection sensitivity is almost not varied.

Further, even when the diffraction element 14 is rotated to the light-detecting means 15, the cross point of the optical axis of the light diffracted by the region 14a of the diffraction element 14 and the light-detecting means 15 goes away from (or, on the contrary, comes close to) the division line 15aa, the cross point of the optical axis of the light diffracted by the region 14d of the diffraction element 14 and the light-detecting means 15 goes away from (or, on the contrary, comes close to) the division line 15db, the cross point of the optical axis of the light diffracted by the region 14b of the diffraction element 14 and the light-detecting means 15 comes close to (or, on the contrary, goes away from) the division line 15bb, and the cross point of the optical axis of the light diffracted by the region 14c of the diffraction element 14 and the light-detecting means 15 comes close to (or, on the contrary, goes away from) the division line 15ca. Thus, the increment and decrement of the focusing error detection sensitivities cancel. Furthermore, by detecting the focusing error in a far field, the focusing error detection sensitivity is almost not varied.

On the other hand, even when the light-generating means 1 is shifted to the direction of the z axis or even when the mirror 2 is shifted to the direction of the y axis to the light-detecting means 15, when the focusing error detected object 5 is located at the convergence point of the image-forming means 4, an area where the beam spot 16aa is supplied to the light-receiving part 15aaa (an area where the beam spot 16aa is supplied to the light-receiving part 15aab) is equal to an area where the beam spot 16bb is supplied to the light-receiving part 15bba (an area where the beam spot 16bb is supplied to the light-receiving part 15bbb), and an area where the beam spot 16ca is supplied to the light-receiving part 15cab (an area where the beam spot 16ca is supplied to the light-receiving part 15caa) is equal to an area where the beam spot 16db is supplied to the light-receiving part 15dbb (an area where the beam spot 16db is supplied to the light-receiving part 15dba). Therefore, no focusing offset occurs.

Further, even when the diffraction element 14 is rotated to the light-detecting means 15, when the focusing error detected object 5 is located at the convergence point of the image-forming means 4, an area where the beam spot 16aa is supplied to the light-receiving part 15aaa (an area where the beam spot 16aa is supplied to the light-receiving part 15aab) is equal to an area where the beam spot 16db is supplied to the light-receiving part 15dba (an area where the beam spot 16bb is supplied to the light-receiving part 15dbb), and an area where the beam spot 16bb is supplied to the light-receiving part 15bbb (an area where the beam spot 16bb is supplied to the light-receiving part 15bba) is equal to an area where the beam spot 16ca is supplied to the light-receiving part 15cab (an area where the beam spot 16ca is supplied to the light-receiving part 15caa). Therefore, no focusing offset occurs.

In the focusing error detection, used are diffracted lights which have a convergence point before the light-detecting means 15 and a convergence point behind the light-detecting means 15, respectively when the focusing error detected object 5 is located at the convergence point of the image-forming means 4. Here, the regions 14a and 14c to generate diffracted light with the convergence point before the light-detecting means 15 are located diagonally, and the regions 14b and 14d to generate diffracted light with the convergence point behind the light-detecting means 15 are located diagonally. Therefore, even when the diffraction element 14 is shifted to the direction of the x or y axis, there occurs no focusing offset.

Figure 10:
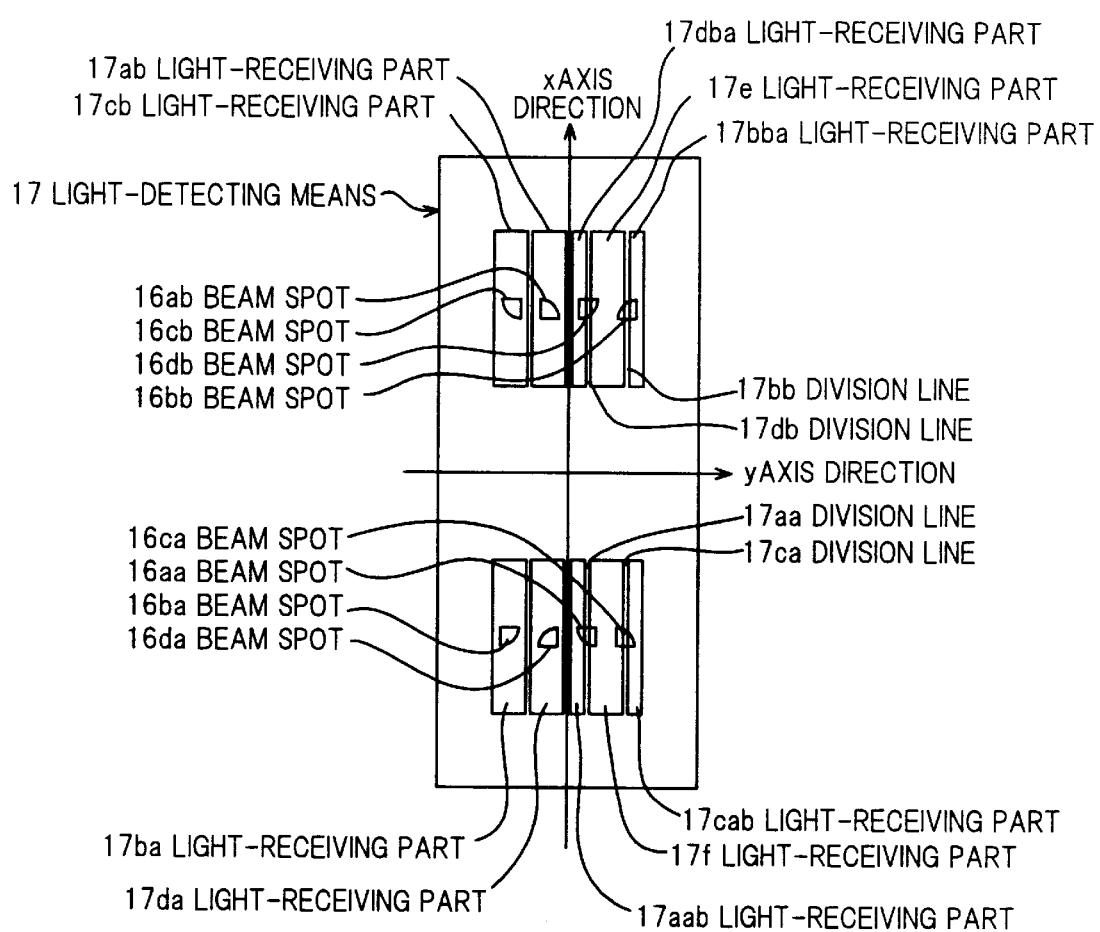
FIG. 10 is a plan view showing a light-detecting means of a focusing error detecting equipment in a fifth preferred embodiment according to the invention.

A focusing error detecting equipment in the fifth preferred embodiment will be explained in FIG. 10. In the fifth embodiment, the light-detecting means 15 in the fourth embodiment is replaced by a light-detecting means 17. FIG. 10 is a plan view showing the light-detecting means 17. A beam spot 16aa is photoelectric-converted at light-receiving parts 17f, 17aab of the light-detecting means 17, a beam spot 16bb is photoelectric-converted at light-receiving parts 17bba, 17e of the light-detecting means 17, a beam spot 16ca is photoelectric-converted at light-receiving parts 17f, 17cab of the light-detecting means 17, a beam spot 16db is photoelectric-converted at light-receiving parts 17dba, 17e of the light-detecting means 17, a beam spot 16ab is photoelectric-converted at a light-receiving part 17ab of the light-detecting means 17, a beam spot 16ba is photoelectric-converted at a light-receiving part 17ba of the light-detecting means 17, a beam spot 16cb is photoelectric-converted at a light-receiving part 17cb of the light-detecting means 17, and a beam spot 16da is photoelectric-converted at a light-receiving part 17da of the light-detecting means 17. Herein, provided that signals to be detected at the light-receiving parts 17aab to 17f are defined by signals S17aab to S17f, respectively, a focusing error is detected by a focusing error signal F5, which has the following relation with the signals S17aab to S17f:

$$F5=S17f-S17aab-S17cab+S17e-S17bba-S17dba.$$

For example, when the focusing error detected object 5 is an optical disk, optical card or the like on which tracks or pit lines are formed, by positioning the tracks or pit lines of the focusing error detected object 5 to be parallel with the x or y axis, a tracking error is detected like the fourth embodiment, by using the signals S17ab to S17da. Namely, the tracking error can be detected by replacing the signal S15ab with the signal S17ab, replacing the signal S15ba with the signal S17ba, replacing the signal 15cb with the S17cb and replacing the signal S15da with the signal S17da.

In the fifth embodiment, the number of light-receiving parts decrease, the number of wirings can be reduced, and the material cost and fabrication steps can be therefore reduced, thereby improving the production yield, as well as having the advantages in the fourth embodiment that the focusing error detection sensitivity is almost not varied and no focusing offset occurs.

Figure 11A:
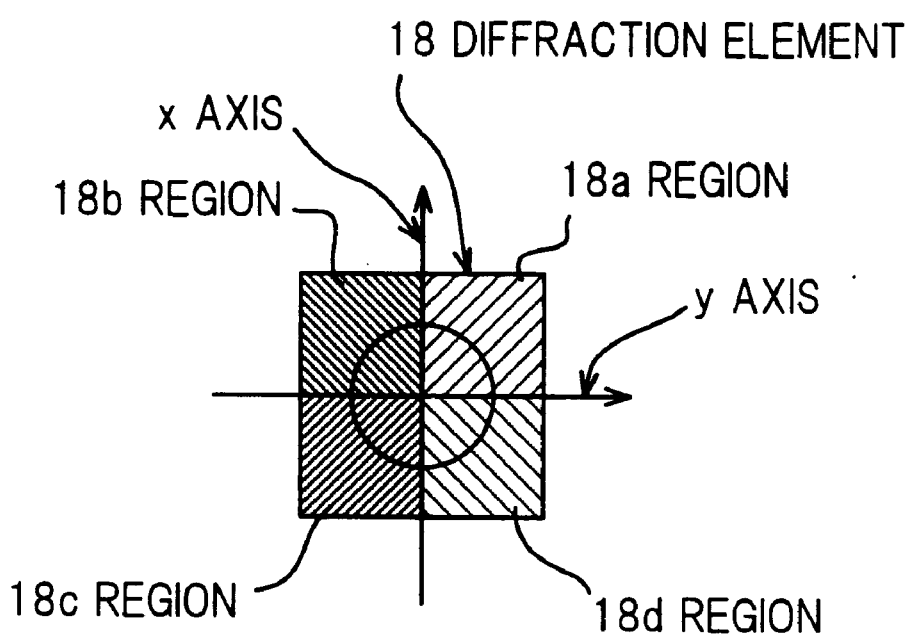
FIGS. 11A and 11B are plan views showing a diffraction element and a light-detecting means, respectively of a focusing error detecting equipment in a sixth preferred embodiment according to the invention.
Figure 11B:
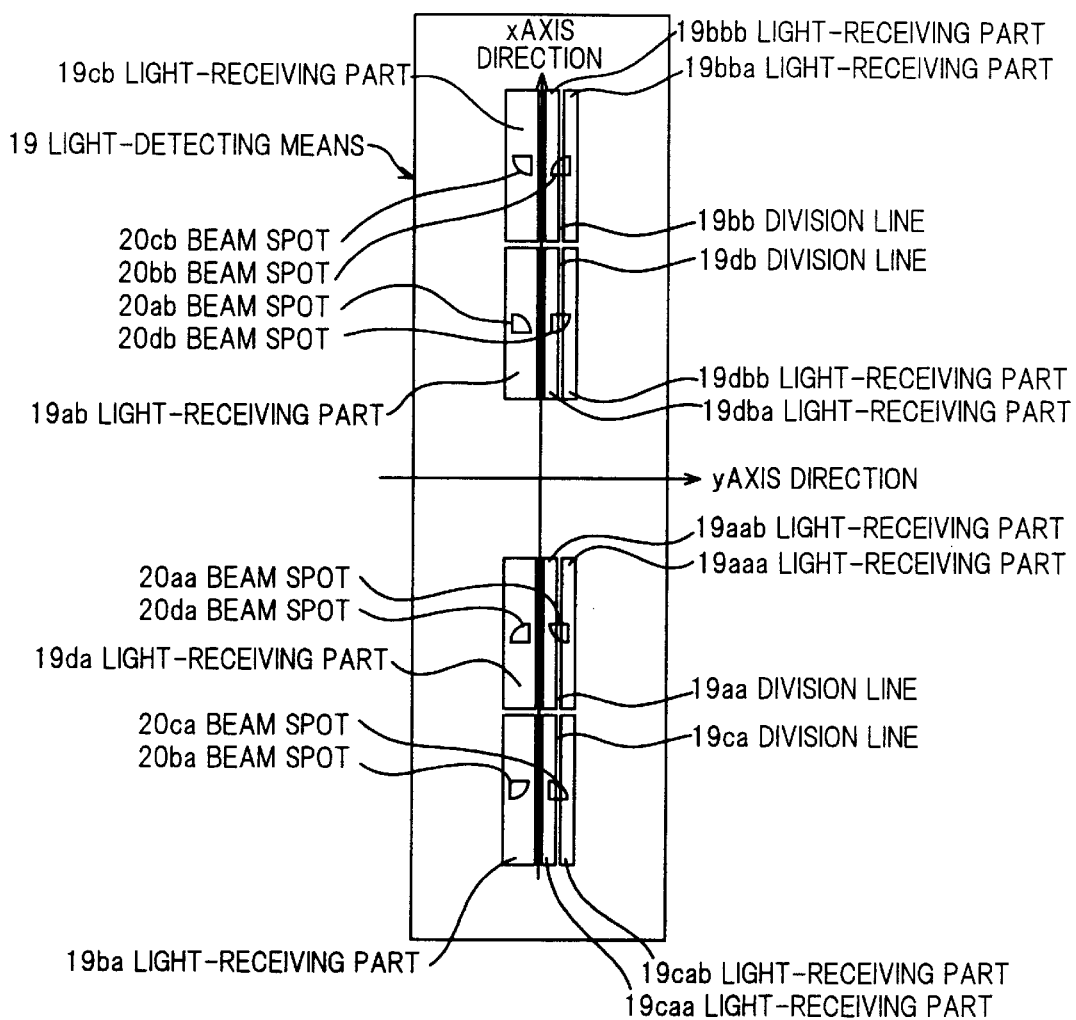

A focusing error detecting equipment in the sixth preferred embodiment will be explained in FIGS. 11A and 11B. In the sixth embodiment, the diffraction element 14 in the fourth embodiment is replaced by a diffraction element 18 and the light-detecting means 15 in the fourth embodiment is replaced by a light-detecting means 19. FIG. 11A is a plan view showing the diffraction element 18 and FIG. 11B is a plan view showing the light-detecting means 19. The diffraction element 18 generates +1st-order diffracted light to be converged before the light-detecting means 19 and −1st-order diffracted light to be converged behind the light-detecting means 19 when the focusing error detected object 5 is located at the convergence point of the image-forming means 4. The diffraction element 18 is divided into four regions 18a to 18d by x and y axes. Light diffracted by the region 18a forms beam spots 20aa, 20ab on the light-detecting means 19, light diffracted by the region 18b forms beam spots 20ba, 20bb on the light-detecting means 19, light diffracted by the region 18c forms beam spots 20ca, 20cb on the light-detecting means 19, and light diffracted by the region 18d forms beam spots 20da, 20db on the light-detecting means 19. The beam spots 20aa, 20ba, 20ca and 20da are beam spots to be formed by +1st-order diffracted light, and the beam spots 20ab, 20bb, 20cb and 20db are beam spots to be formed by −1st-order diffracted light.

Also, the beam spot 20aa is photoelectric-converted at light-receiving parts 19aaa, 19aab of the light-detecting means 19, the beam spot 20bb is photoelectric-converted at light-receiving parts 19bba, 19bbb of the light-detecting means 19, the beam spot 20ca is photoelectric-converted at light-receiving parts 19caa, 19cab of the light-detecting means 19, the beam spot 20db is photoelectric-converted at light-receiving parts 19dba, 19dbb of the light-detecting means 19, the beam spot 20ab is photoelectric-converted at a light-receiving part 19ab of the light-detecting means 19, the beam spot 20ba is photoelectric-converted at a light-receiving part 19ba of the light-detecting means 19, the beam spot 20cb is photoelectric-converted at a light-receiving part 19cb of the light-detecting means 19, and the beam spot 20da is photoelectric-converted at a light-receiving part 19da of the light-detecting means 19. Herein, provided that signals to be detected at the light-receiving parts 19aaa to 19dbb are defined by signals S19aaa to S19dbb, respectively, a focusing error is detected by a focusing error signal F6, which has the following relation with the signals S19aaa to S19dbb:

$$F6=S19aaa-S19aab-S19bba+S19bbb+S19caa-S19cab-S19dba+S19dbb.$$

Also, provided that points upon which +1st-order diffracted lights from the regions 18a, 18b, 18c and 18d are converged when the focusing error detected object 5 is located at the convergence point of the image-forming means 4 are defined by points P18a, P18b, P18c and P18d, respectively, interference fringes which appear at the respective regions 18a, 18b, 18c and 18d when point light sources are placed at a light-emitting point of the light-generating means 1 and the respective points P18a, P18b, P18c and P18d are recorded on the regions 18a, 18b, 18c and 18d of the diffraction element 18.

For example, when the focusing error detected object 5 is an optical disk, optical card or the like on which tracks or pit lines are formed, by positioning the tracks or pit lines of the focusing error detected object 5 to be parallel with the x or y axis, a tracking error is detected like the fourth embodiment, by using the signals S19*ab* to S19*da*. Namely, the tracking error can be detected by replacing the signal S15*ab* with the signal S19*ab*, replacing the signal S15*ba* with the signal S19*ba*, replacing the signal 15*cb* with the S19*cb* and replacing the signal S15*da* with the signal S19*da*.

In the sixth embodiment, the arrangement of light-receiving parts in the fourth embodiment is changed while having the advantages in the fourth embodiment that the focusing error detection sensitivity is almost not varied and no focusing offset occurs. Namely, it is proved that the invention is not limited to the arrangement of light-receiving parts.

Figure 12A:
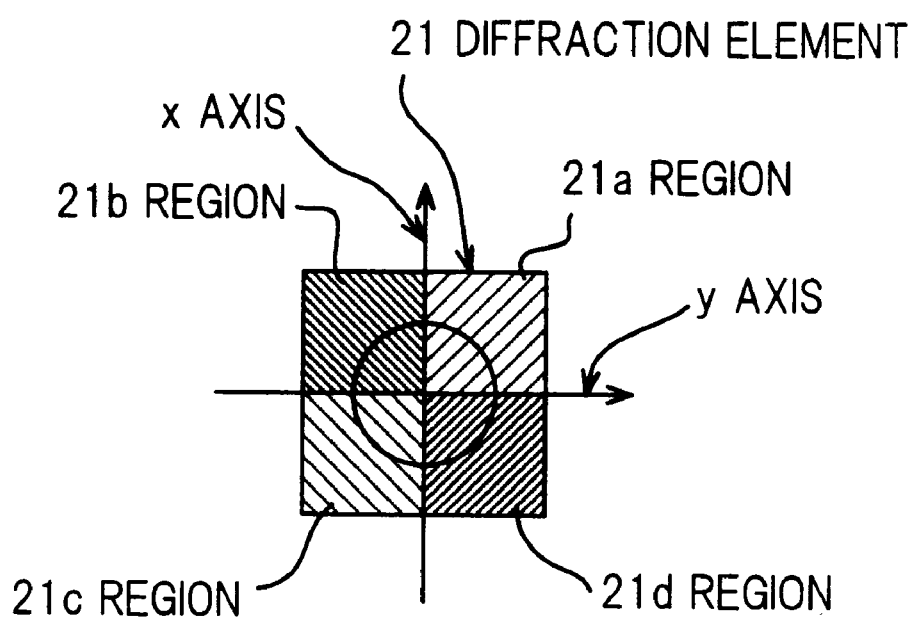
FIGS. 12A and 12B are plan views showing a diffraction element and a light-detecting means, respectively of a focusing error detecting equipment in a seventh preferred embodiment according to the invention.
Figure 12B:
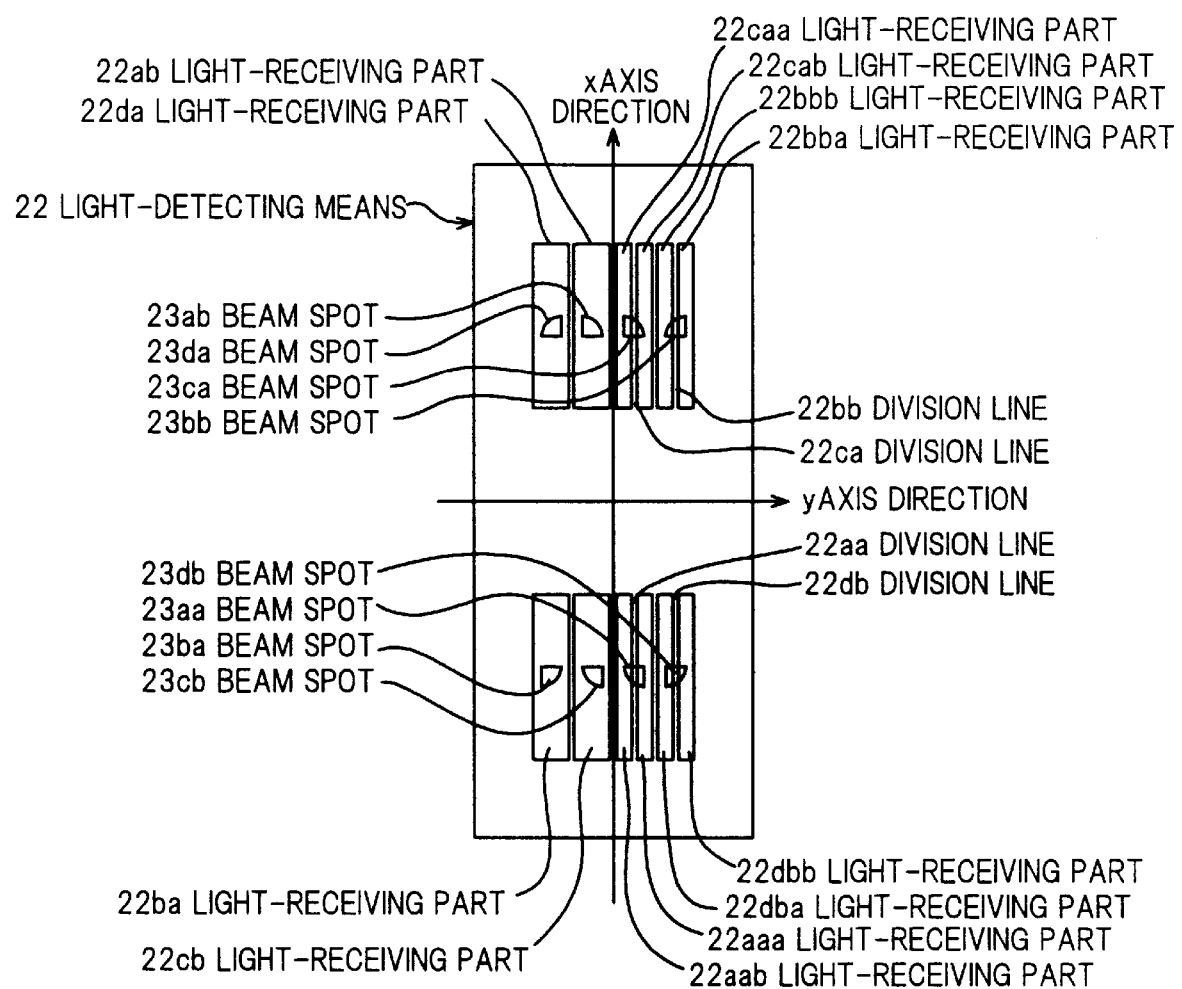

A focusing error detecting equipment in the seventh preferred embodiment will be explained in FIGS. 12A and 12B. In the seventh embodiment, the diffraction element 3 in the first embodiment is replaced by a diffraction element 21 and the light-detecting means 6 in the first embodiment is replaced by a light-detecting means 22. FIG. 12A is a plan view showing the diffraction element 21 and FIG. 11B is a plan view showing the light-detecting means 22. The diffraction element 21 generates +1st-order diffracted light to be converged before the light-detecting means 22 and −1st-order diffracted light to be converged behind the light-detecting means 22 when the focusing error detected object 5 is located at the convergence point of the image-forming means 4. The diffraction element 21 is divided into four regions 21*a* to 21*d* by x and y axes. Light diffracted by the region 21*a* forms beam spots 23*aa*, 23*ab* on the light-detecting means 22, light diffracted by the region 21*b* forms beam spots 23*ba*, 23*bb* on the light-detecting means 22, light diffracted by the region 21*c* forms beam spots 23*ca*, 23*cb* on the light-detecting means 22, and light diffracted by the region 21*d* forms beam spots 23*da*, 23*db* on the light-detecting means 22. The beam spots 23*aa*, 23*ba*, 23*ca* and 23*da* are beam spots to be formed by +1st-order diffracted light, and the beam spots 23*ab*, 23*bb*, 23*cb* and 23*db* are beam spots to be formed by −1st-order diffracted light.

Also, the beam spot 23*aa* is photoelectric-converted at light-receiving parts 22*aaa*, 22*aab* of the light-detecting means 22, the beam spot 23*bb* is photoelectric-converted at light-receiving parts 22*bba*, 22*bbb* of the light-detecting means 22, the beam spot 23*ca* is photoelectric-converted at light-receiving parts 22*caa*, 22*cab* of the light-detecting means 22, the beam spot 23*db* is photoelectric-converted at light-receiving parts 22*dba*, 22*dbb* of the light-detecting means 22, the beam spot 23*ab* is photoelectric-converted at a light-receiving part 22*ab* of the light-detecting means 22, the beam spot 23*ba* is photoelectric-converted at a light-receiving part 22*ba* of the light-detecting means 22, the beam spot 23*cb* is photoelectric-converted at a light-receiving part 22*cb* of the light-detecting means 22, and the beam spot 23*da* is photoelectric-converted at a light-receiving part 22*da* of the light-detecting means 22. Herein, provided that signals to be detected at the light-receiving parts 22*aaa* to 22*dbb* are defined by signals S22*aaa* to S2*dbb*, respectively, a focusing error is detected by a focusing error signal F7, which has the following relation with the signals S22*aaa* to S22*dbb*:

$$F7 = S22aaa - S22aab - S22bba + S22bbb + S22caa - S22cab - S22dba + S22dbb.$$

Also, provided that points upon which +1st-order diffracted lights from the regions 21*a*, 21*b*, 21*c* and 21*d* are converged when the focusing error detected object 5 is located at the convergence point of the image-forming means 4 are defined by points P21*a*, P21*b*, P21*c* and P21*d*, respectively, interference fringes which appear at the respective regions 21*a*, 21*b*, 21*c* and 21*d* when point light sources are placed at a light-emitting point of the light-generating means 1 and the respective points P21*a*, P21*b*, P21*c* and P21*d* are recorded on the regions 21*a*, 21*b*, 21*c* and 21*d* of the diffraction element 21.

For example, when the focusing error detected object 5 is an optical disk, optical card or the like on which tracks or pit lines are formed, by positioning the tracks or pit lines of the focusing error detected object 5 to be parallel with the x or y axis, a tracking error is detected by tracking error signals T9, T10, which have the following relations with the signals S22*ab* to S22*da*. Also, by positioning the tracks or pit lines of the focusing error detected object 5 to be parallel with the y axis, a tracking error is detected by a tracking error signal T11. Further, by positioning the tracks or pit lines of the focusing error detected object 5 to be parallel with the x axis, a tracking error is detected by a tracking error signal T12.

1) When servomechanism by the heterodyne detection method is used,

T9=|a difference between the amplitude of (S22*ab*−S22*ba*+S22*cb*−S22*da*) to be retained when (S22*ab*+S22*ba*+S22*cb*+S22*da*) has a zero-cross rising and the amplitude of (S22*ab*−S22*ba*+S22*cb*−S22*da*) to be retained when (S22*ab*+S22*ba*+S22*cb*+S22*da*) has a zero-cross rising|

2) When servomechanism by the differential time detection method or the differential phase detection method is used, T10=|the amplitude conversion value of a time difference or phase difference between (S22*ab*+S22*cb*) and (S22*ba*+S22*da*)|

3) When servomechanism by the push-pull method is used, $$T11 = S22ab + S22ba - S22cb - S22da,$$

$$T12 = S22ab - S22ba - S22cb + S22da.$$

Meanwhile, when a tracking error is detected by the tracking error signal T12, the neighboring light-receiving parts 22*ab*, 22*da* can be unified into one light-receiving part and the neighboring light-receiving parts 22*ba*, 22*cb* can be unified into one light-receiving part. Thereby, the number of light-receiving parts decrease, the number of wirings can be reduced, and the material cost and fabrication steps can be therefore reduced, thereby improving the production yield. However, the tracking error signal may mix into the focusing error signal.

Also, in this composition, even when the light-generating means 1 is shifted to the direction of the z axis or even when the mirror 2 is shifted to the direction of the y axis to the light-detecting means 22, the cross point of the optical axis of the light-diffracted by the region 21*a* of the diffraction element 21 and the light-detecting means 22 goes away from (or, on the contrary, comes close to) a division line 22*aa*, the cross point of the optical axis of the light diffracted by the region 21*b* of the diffraction element 21 and the light-detecting means 22 goes away from (or, on the contrary, comes close to) a division line 22*bb*, the cross point of the optical axis of the light diffracted by the region 21*c* of the diffraction element 21 and the light-detecting means 22 comes close to (or, on the contrary goes away from) a division line 22*ca*, and the cross point of the optical axis of the light diffracted by the region 21*d* of the diffraction element 21 and the light-detecting means 22 comes close to (or, on the contrary, goes away from) a division line 22*db*.

Thus, the increment and decrement of the focusing error detection sensitivities cancel. Furthermore, by detecting the focusing error in a far field, the focusing error detection sensitivity is almost not varied.

Further, even when the diffraction element 21 is rotated to the light-detecting means 22, the cross point of the optical axis of the light diffracted by the region 21a of the diffraction element 21 and the light-detecting means 22 goes away from (or, on the contrary, comes close to) the division line 22aa, the cross point of the optical axis of the light diffracted by the region 21c of the diffraction element 21 and the light-detecting means 22 goes away from (or, on the contrary, comes close to) the division line 22ca, the cross point of the optical axis of the light diffracted by the region 21b of the diffraction element 21 and the light-detecting means 22 comes close to (or, on the contrary, goes away from) the division line 22bb, and the cross point of the optical axis of the light diffracted by the region 21d of the diffraction element 21 and the light-detecting means 22 comes close to (or, on the contrary, goes away from) the division line 22db. Thus, the increment and decrement of the focusing error detection sensitivities cancel. Furthermore, by detecting the focusing error in a far field, the focusing error detection sensitivity is almost not varied.

On the other hand, even when the light-generating means 1 is shifted to the direction of the z axis or even when the mirror 2 is shifted to the direction of the y axis to the light-detecting means 22, when the focusing error detected object 5 is located at the convergence point of the image-forming means 4, an area where the beam spot 23aa is supplied to the light-receiving part 22aaa (an area where the beam spot 23aa is supplied to the light-receiving part 22aab) is equal to an area where the beam spot 23bb is supplied to the light-receiving part 22bba (an area where the beam spot 23bb is supplied to the light-receiving part 22bbb), and an area where the beam spot 23ca is supplied to the light-receiving part 22cab (an area where the beam spot 23ca is supplied to the light-receiving part 22caa) is equal to an area where the beam spot 23db is supplied to the light-receiving part 22dbb (an area where the beam spot 23db is supplied to the light-receiving part 22dba). Therefore, no focusing offset occurs.

Here, signals S22aaa, S22bbb, S22caa and S22dbb to be detected by the light-receiving parts 22aaa, 22bbb, 22caa and 22dbb, respectively have plus signs when calculating the focusing error signal F7. On the other hand, signals S22aab, S22bba, S22cab and S22dba to be detected by the light-receiving parts 22aab, 22bba, 22cab and 22dba, respectively have minus signs when calculating the focusing error signal F7. Therefore, by rotating the diffraction element 21 to the light-detecting means 22, the focusing offset can be removed.

In the focusing error detection, used are diffracted lights which have a convergence point before the light-detecting means 22 and a convergence point behind the light-detecting means 22, respectively when the focusing error detected object 5 is located at the convergence point of the image-forming means 4. Here, the regions 21a and 21c to generate diffracted light with the convergence point before the light-detecting means 22 are located diagonally, and the regions 21b and 21d to generate diffracted light with the convergence point behind the light-detecting means 22 are located diagonally. Therefore, even when the diffraction element 21 is shifted to the direction of the x or y axis, there occurs no focusing offset.

Figure 13A:
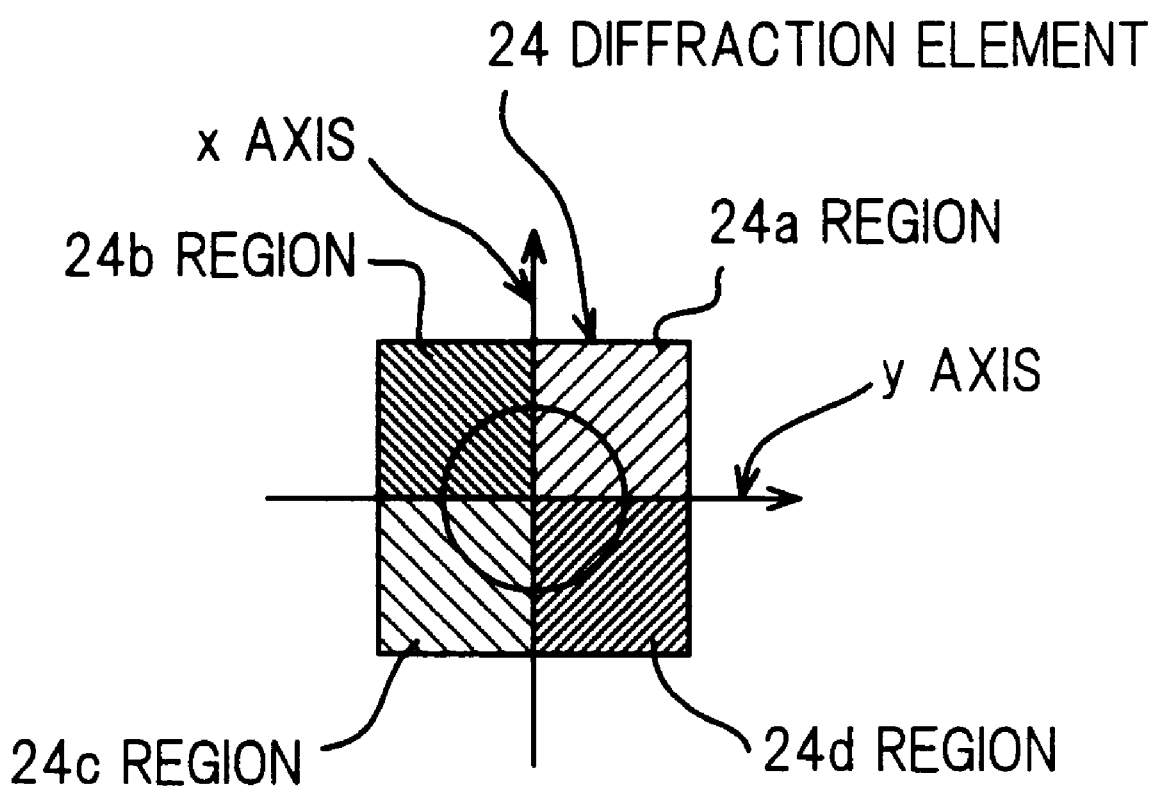
FIGS. 13A and 13B are plan views showing a diffraction element and a light-detecting means, respectively of a focusing error detecting equipment in an eighty preferred embodiment according to the invention.
Figure 13B:
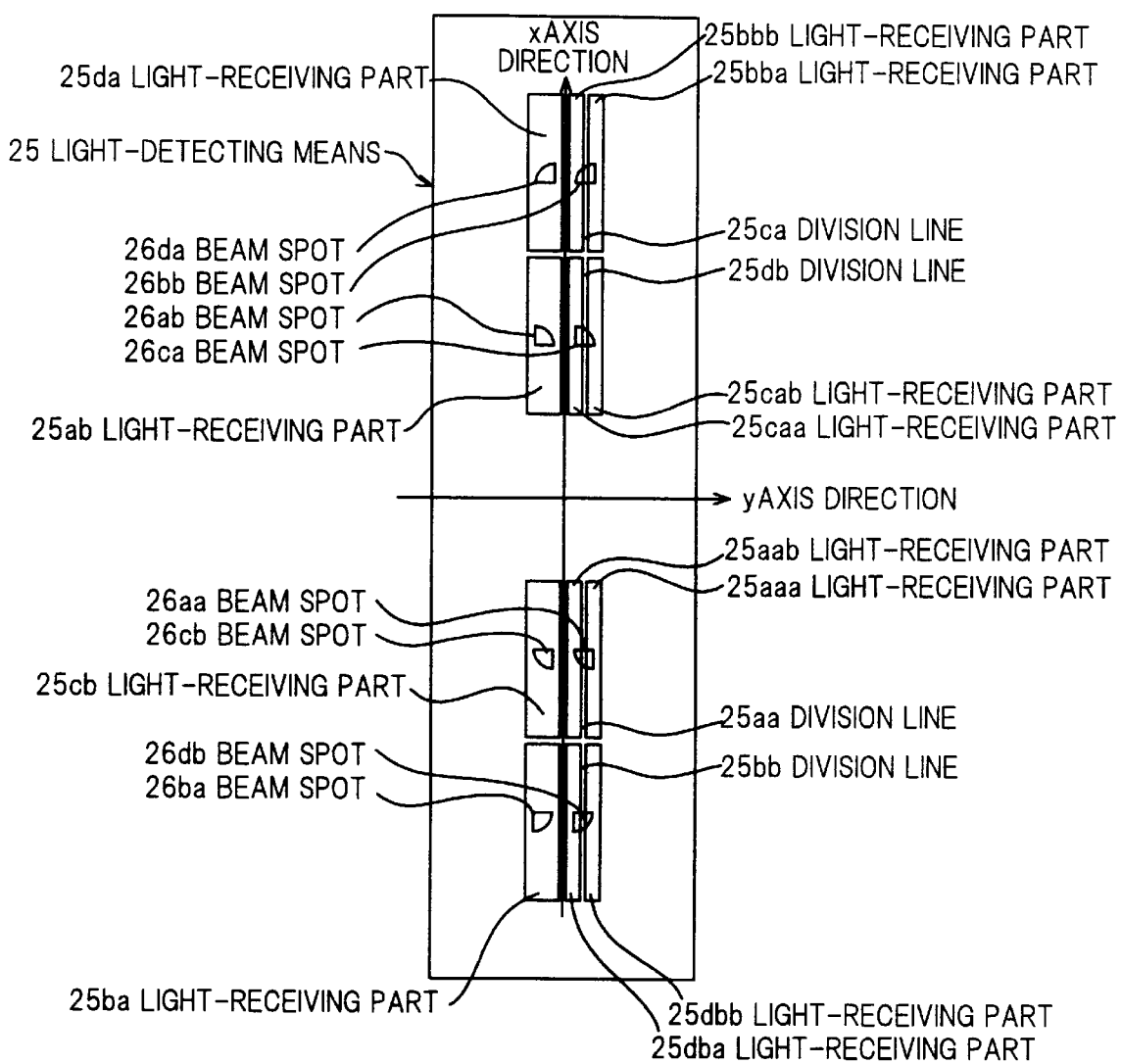

A focusing error detecting equipment in the eighth preferred embodiment will be explained in FIGS. 13A and 13B.

In the eighth embodiment, the diffraction element 21 in the seventh embodiment is replaced by a diffraction element 24 and the light-detecting means 22 in the seventh embodiment is replaced by a light-detecting means 25. FIG. 13A is a plan view showing the diffraction element 24 and FIG. 13B is a plan view showing the light-detecting means 25. The diffraction element 24 generates +1st-order diffracted light to be converged before the light-detecting means 25 and −1st-order diffracted light to be converged behind the light-detecting means 25 when the focusing error detected object 5 is located at the convergence point of the image-forming means 4. The diffraction element 24 is divided into four regions 24a to 24d by x and y axes. Light diffracted by the region 24a forms beam spots 26aa, 26ab on the light-detecting means 25, light diffracted by the region 24b forms beam spots 26ba, 26bb on the light-detecting means 25, light diffracted by the region 24c forms beam spots 26ca, 26cb on the light-detecting means 25, and light diffracted by the region 24d forms beam spots 26da, 26db on the light-detecting means 25. The beam spots 26aa, 26ba, 26ca and 26da are beam spots to be formed by +1st-order diffracted light, and the beam spots 26ab, 26bb, 26cb and 26db are beam spots to be formed by −1st-order diffracted light.

Also, the beam spots 26aa is photoelectric-converted at light-receiving parts 25aaa, 25aab of the light-detecting means 25, the beam spot 26bb is photoelectric-converted at light-receiving parts 25bba, 25bbb of the light-detecting means 25, the beam spot 26ca is photoelectric-converted at light-receiving parts 25caa, 25cab of the light-detecting means 25, the beam spot 26db is photoelectric-converted at light-receiving parts 25dba, 25dbb of the light-detecting means 25, the beam spot 26ab is photoelectric-converted at a light-receiving part 25ab of the light-detecting means 25, the beam spot 26ba is photoelectric-converted at a light-receiving part 25ba of the light-detecting means 25, the beam spot 26cb is photoelectric-converted at a light-receiving part 25cb of the light-detecting means 25, and the beam spot 26da is photoelectric-converted at a light-receiving part 25da of the light-detecting means 25. Herein, provided that signals to be detected at the light-receiving parts 25aaa to 25dbb are defined by signals S25aaa to S25dbb, respectively, a focusing error is detected by a focusing error signal F8, which has the following relation with the signals S25aaa to S25dbb:

$$F8 = S25aaa - S25aab - S25bba + S25bbb + S25caa - S25cab - S25dba + S25dbb.$$

Also, provided that points upon which +1st-order diffracted lights from the regions 24a, 24b, 24c and 24d are converged when the focusing error detected object 5 is located at the convergence point of the image-forming means 4 are defined by points P24a, P24b, P24c and P24d, respectively, interference fringes which appear at the respective regions 24a, 24b, 24c and 24d when point light sources are placed at a light-emitting point of the light-generating means 1 and the respective points P24a, P24b, P24c and P24d are recorded on the regions 24a, 24b, 24c and 24d of the diffraction element 24.

For example, when the focusing error detected object 5 is an optical disk, optical card or the like on which tracks or pit lines are formed, by positioning the tracks or pit lines of the focusing error detected object 5 to be parallel with the X or Y axis, a tracking error is detected like the seventh embodiment, by using the signals S25ab to S25da. Namely, the tracking error can be detected by replacing the signal S22ab with the signal S25ab, replacing the signal S22ba with the signal S25ba, replacing the signal 22cb with the S25cb and replacing the signal s22da with the signal S25da.

In the eighth embodiment, the arrangement of light-receiving parts in the seventh embodiment is changed while having the advantages in the seventh embodiment that the focusing error detection sensitivity is almost not varied and no focusing offset occurs or the focusing offset can be removed. Namely, it is proved that the invention is not limited to the arrangement of light-receiving parts.

Figure 14:
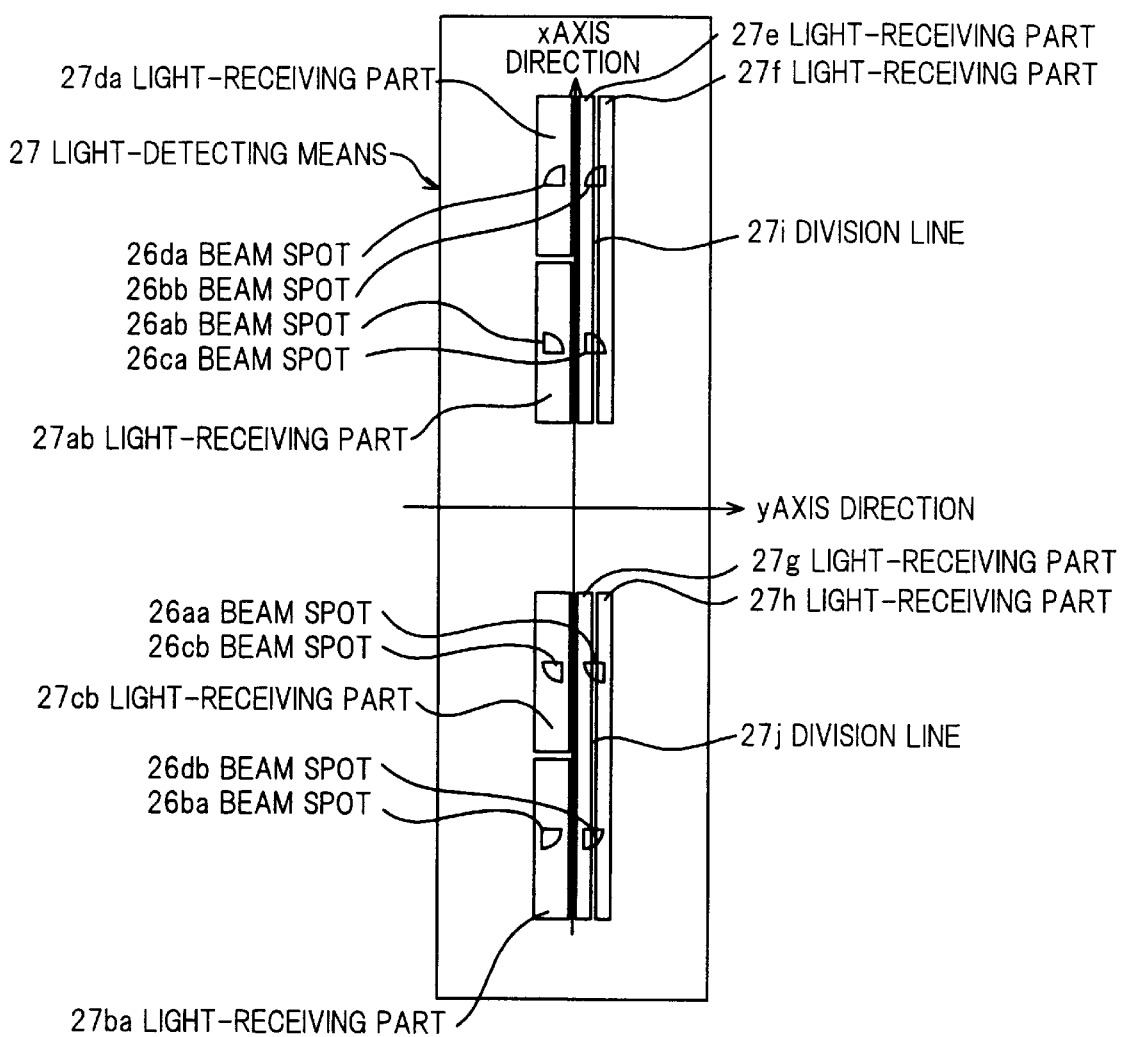
FIG. 14 is a plan view showing a light-detecting means of a focusing error detecting equipment in a ninth preferred embodiment according to the invention.

A focusing error detecting equipment in the ninth preferred embodiment will be explained in FIG. 14. In the ninth embodiment, the light-detecting means 25 in the eighth embodiment is replaced by a light-detecting means 27. FIG. 14 is a plan view showing the light-detecting means 27. A beam spot 26aa is photoelectric-converted at light-receiving parts 27g, 27h of the light-detecting means 27, a beam spot 26bb is photoelectric-converted at light-receiving parts 27e, 27f of the light-detecting means 27, a beam spot 26ca is photoelectric-converted at the light-receiving parts 27e, 27f of the light-detecting means 27, a beam spot 26db is photoelectric-converted at the light-receiving parts 27g, 27h of the light-detecting means 27, a beam spot 26ab is photoelectric-converted at a light-receiving part 27ab of the light-detecting means 27, a beam spot 26ba is photoelectric-converted at a light-receiving part 27ba of the light-detecting means 27, a beam spot 26cb is photoelectric-converted at a light-receiving part 27cb of the light-detecting means 27, and a beam spot 26da is photoelectric-converted at a light-receiving part 27da of the light-detecting means 27. Herein, provided that signals to be detected at the light-receiving parts 27ab to 27h are defined by signals S27ab to S27h, respectively, a focusing error is detected by a focusing error signal F9, which has the following relation with the signals S27e to S27h:

$$F9=S27e-S27f-S27g+S27h.$$

For example, when the focusing error detected object 5 is an optical disk, optical card or the like on which tracks or pit lines are formed, by positioning the tracks or pit lines of the focusing error detected object 5 to be parallel with the x or y axis, a tracking error is detected like the seventh embodiment, by using the signals S27ab to S27da. Namely, the tracking error can be detected by replacing the signal S22ab with the signal S27ab, replacing the signal S22ba with the signal S27ba, replacing the signal 22cb with the S27db and replacing the signal S22da with the signal S27da.

In the ninth embodiment, by replacing the light-receiving parts 25aaa, 25dbb with the light-receiving part 27h, replacing the light-receiving parts 25aab, 25dba with the light-receiving part 27g, replacing the light-receiving parts 25bba, 25cab with the light-receiving part 27f, replacing the light-receiving parts 25bbb, 25caa with the light-receiving part 27e, replacing the division lines 25aa, 25bb with a division line 27j and replacing the division lines 25ca, 25db with a division line 27i, the number of light-receiving parts decrease, the number of wirings can be reduced, and the material cost and fabrication steps can be therefore reduced, thereby improving the production yield, as well as having the advantages in the eighth embodiment that the focusing error detection sensitivity is almost not varied and no focusing offset occurs or the focusing error can be removed.

Figure 15A:
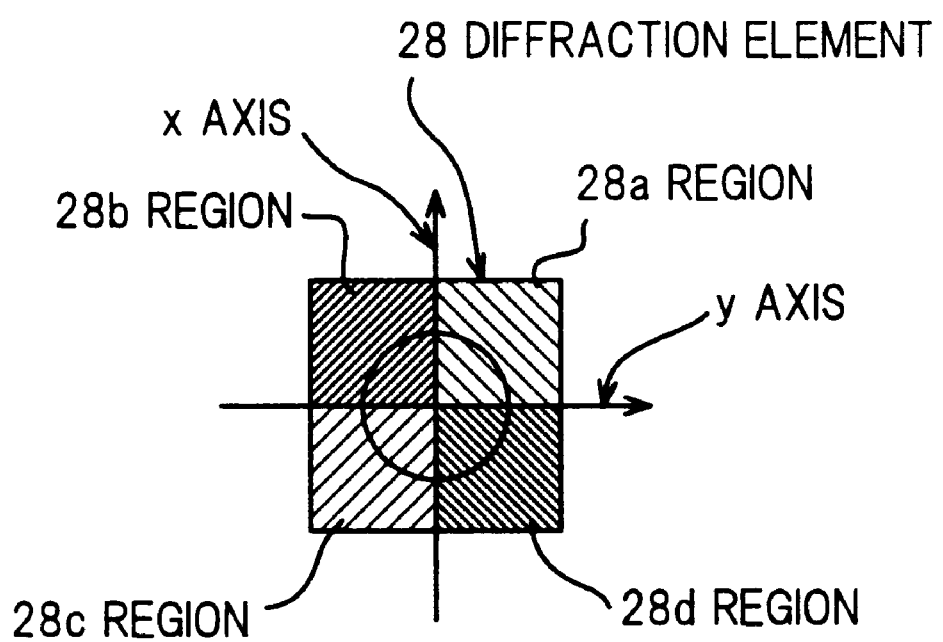
FIGS. 15A and 15B are plan views showing a diffraction element and a light-detecting means, respectively of a focusing error detecting equipment in a tenth preferred embodiment according to the invention.
Figure 15B:
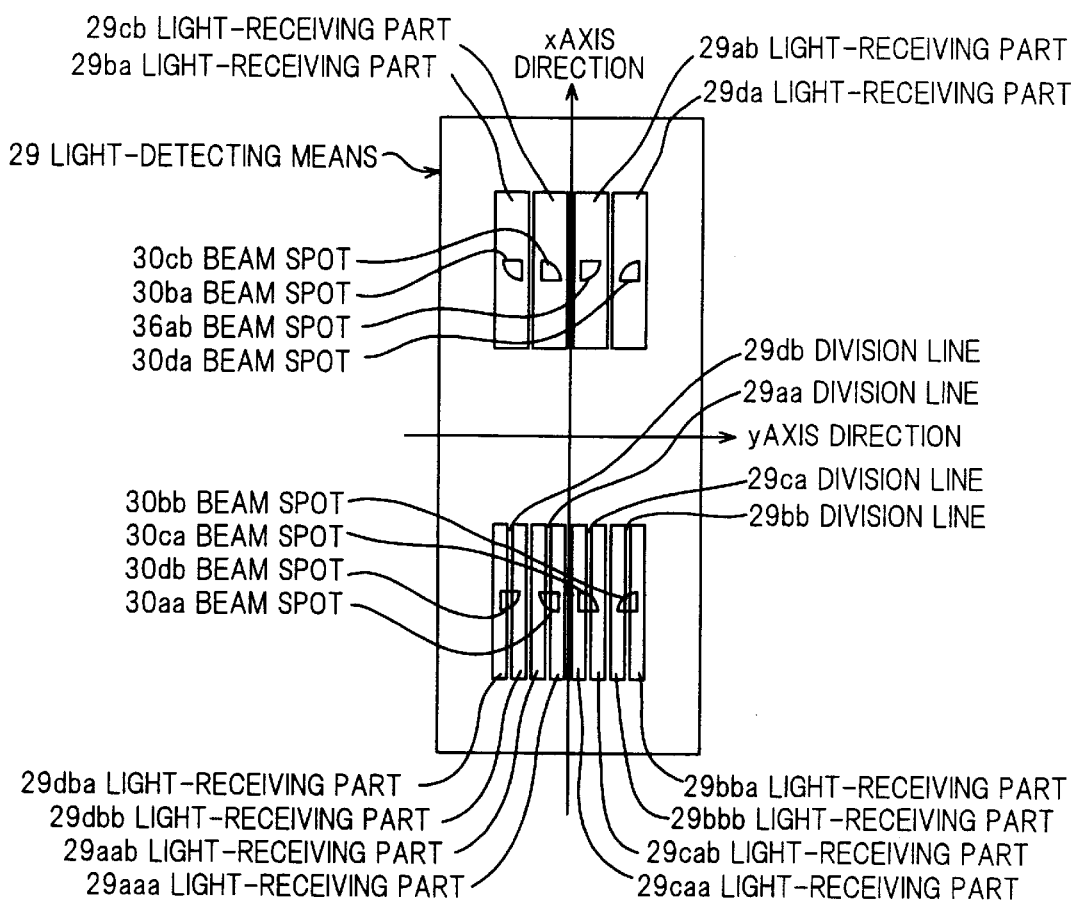

A focusing error detecting equipment in the tenth preferred embodiment will be explained in FIGS. 15A and 15B. In the tenth embodiment, the diffraction element 3 in the first embodiment is replaced by a diffraction element 28 and the light-detecting means 6 in the first embodiment is replaced by a light-detecting means 29. FIG. 15A is a plan view showing the diffraction element 28 and FIG. 15B is a plan view showing the light-detecting means 29. The diffraction element 28 generates +1st-order diffracted light to be converged before the light-detecting means 29 and −1st-order diffracted light to be converged behind the light-detecting means 29 when the focusing error detected object 5 is located at the convergence point of the image-forming means 4. The diffraction element 28 is divided into four regions 28a to 28d by x and y axes. Light diffracted by the region 28a forms beam spots 30aa, 30ab on the light-detecting means 29, light diffracted by the region 28b forms beam spots 30ba, 30bb on the light-detecting means 29, light diffracted by the region 28c forms beam spots 30ca, 30cb on the light-detecting means 29, and light diffracted by the region 28d forms beam spots 30da, 30db on the light-detecting means 29. The beam spots 30aa, 30ba, 30ca and 30da are beam spots to be formed by +1st-order diffracted light, and the beam spots 30ab, 30bb, 30cb and 30db are beam spots to be formed by −1st-order diffracted light.

Also, the beam spot 30aa is photoelectric-converted at light-receiving parts 29aaa, 29aab of the light-detecting means 29, the beam spot 30bb is photoelectric-converted at light-receiving parts 29bba, 29bbb of the light-detecting means 29, the beam spot 30ca is photoelectric-converted at light-receiving parts 29caa, 29cab of the light-detecting means 29, the beam spot 30db is photoelectric-converted at light-receiving parts 29dba, 29dbb of the light-detecting means 29, the beam spot 30ab is photoelectric-converted at a light-receiving part 29ab of the light-detecting means 29, the beam spot 30ba is photoelectric-converted at a light-receiving part 29ba of the light-detecting means 29, the beam spot 30cb is photoelectric-converted at a light-receiving part 29cb of the light-detecting means 29, and the beam spot 30da is photoelectric-converted at a light-receiving part 29da of the light-detecting means 29. Herein, provided that signals to be detected at the light-receiving parts 29aaa to 29dbb are defined by signals S29aaa to S29dbb, respectively, a focusing error is detected by a focusing error signal F10, which has the following relation with the signals S29aaa to S29dbb:

$$F10=S29aaa-S29aab-S29bba+S29bbb+S29caa-S29cba-S29dba+S29dbb.$$

Also, provided that points upon which +1st-order diffracted lights from the regions 28a, 28b, 28c and 28d are converged when the focusing error detected object 5 is located at the convergence point of the image-forming means 4 are defined by points P28a, P28b, P28c and P28d, respectively, interference fringes which appear at the respective regions 28a, 28b, 28c and 28d when point light sources are placed at a light-emitting point of the light-generating means 1 and the respective points P28a, P28b, P28c and P28d are recorded on the regions 28a, 28b, 28c and 28d of the diffraction element 28.

For example, when the focusing error detected object 5 is an optical disk, optical card or the like on which tracks or pit lines are formed, by positioning the tracks or pit lines of the focusing error detected object 5 to be parallel with the x or y axis, a tracking error is detected by tracking error signals T13, T14, which have the following relations with the signals S29ab to S29da. Also, by positioning the tracks or pit lines of the focusing error detected object 5 to be parallel with the y axis, a tracking error is detected by a tracking error signal T15. Further, by positioning the tracks or pit lines of the focusing error detected object 5 to be parallel with the x axis, a tracking error is detected by a tracking error signal T16.

1) When servomechanism by the heterodyne detection method is used,

T13=|a difference between the amplitude of (S29*ab*–S29*ba*+S29*cb*–S29*da*) to be retained when (S29*ab*+S29*ba*+S29*cb*+S29*da*) has a zero-cross rising and the amplitude of (S29*ab*–S29*ba*+S29*cb*–S29*da*) to be retained when (S29*ab*+S29*ba*+S29*cb*+S29*da*) has a zero-cross rising|

2) When servomechanism by the differential time detection method or the differential phase detection method is used, T14=|the amplitude conversion value of a time difference or phase difference between (S29*ab*+S29*cb*) and (S29*ba*+S29*da*)|

3) When servomechanism by the push-pull method is used, $$T15 = S29ab + S29ba - S29cb - S29da,$$

$$T16 = S29ab - S19ba - S29cb + S29da.$$

Meanwhile, when a tracking error is detected by the tracking error signal T16, the neighboring light-receiving parts 29*ab*, 29*da* can be unified into one light-receiving part and the neighboring light-receiving parts 29*ba*, 29*cb* can be unified into one light-receiving part. Thereby, the number of light-receiving parts decrease, the number of wirings can be reduced, and the material cost and fabrication steps can be therefore reduced, thereby improving the production yield. However, the tracking error signal may mix into the focusing error signal.

Also, in this composition, even when the light-generating means 1 is shifted to the direction of the z axis or even when the mirror 2 is shifted to the direction of the y axis to the light-detecting means 29, the cross point of the optical axis of the light-diffracted by the region 28*a* of the diffraction element 28 and the light-detecting means 29 goes away from (or, on the contrary, comes close to) a division line 29*aa*, the cross point of the optical axis of the light diffracted by the region 28*b* of the diffraction element 28 and the light-detecting means 29 goes away from (or, on the contrary, comes close to) a division line 29*bb*, the cross point of the optical axis of the light diffracted by the region 28*c* of the diffraction element 28 and the light-detecting means 29 comes close to (or, on the contrary, goes away from) a division line 29*ca*, and the cross point of the optical axis of the light diffracted by the region 28*d* of the diffraction element 28 and the light-detecting means 29 comes close to (or, on the contrary, goes away from) a division line 29*db*. Thus, the increment and decrement of the focusing error detection sensitivities cancel. Furthermore, by detecting the focusing error in a far field, the focusing error detection sensitivity is almost not varied.

Further, even when the diffraction element 28 is rotated to the light-detecting means 29, the cross point of the optical axis of the light diffracted by the region 28*a* of the diffraction element 28 and the light-detecting means 29 goes away from (or, on the contrary, comes close to) the division line 29*aa*, the cross point of the optical axis of the light diffracted by the region 28*b* of the diffraction element 28 and the light-detecting means 29 goes away from (or, on the contrary, comes close to) the division line 29*bb*, the cross point of the optical axis of the light diffracted by the region 28*c* of the diffraction element 28 and the light-detecting means 29 comes close to (or, on the contrary, goes away from) the division line 29*ca*, and the cross point of the optical axis of the light diffracted by the region 28*d* of the diffraction element 28 and the light-detecting means 29 comes close to (or, on the contrary, goes away from) the division line 29*db*. Thus, the increment and decrement of the focusing error detection sensitivities cancel. Furthermore, by detecting the focusing error in a far field, the focusing error detection sensitivity is almost not varied.

On the other hand, even when the light-generating means 1 is shifted to the direction of the z axis or even when the mirror 2 is shifted to the direction of the y axis to the light-detecting means 29 or even when the diffraction element 28 is rotated to the light-detecting means 29, when the focusing error detected object 5 is located at the convergence point of the image-forming means 4, an area where the beam spot 30*aa* is supplied to the light-receiving part 29*aaa* (an area where the beam spot 30*aa* is supplied to the light-receiving part 29*aab*) is equal to an area where the beam spot 30*bb* is supplied to the light-receiving part 29*bba* (an area where the beam spot 30*bb* is supplied to the light-receiving part 29*bbb*), and an area where the beam spot 30*ca* is supplied to the light-receiving part 29*cab* (an area where the beam spot 30*ca* is supplied to the light-receiving part 29*caa*) is equal to an area where the beam spot 30*db* is supplied to the light-receiving part 29*dbb* (an area where the beam spot 30*db* is supplied to the light-receiving part 29*dba*). Therefore, no focusing offset occurs.

In the focusing error detection, used are diffracted lights which have a convergence point before the light-detecting means 29 and a convergence point behind the light-detecting means 29, respectively when the focusing error detected object 5 is located at the convergence point of the image-forming means 4. Here, the regions 28*a* and 28*c* to generate diffracted light with the convergence point before the light-detecting means 29 are located diagonally, and the region 28*b* and 28*d* to generate diffracted light with the convergence point behind the light-detecting means 29 are located diagonally. Therefore, even when the diffraction element 28 is shifted to the direction of the x or y axis, there occurs no focusing offset.

Figure 16A:
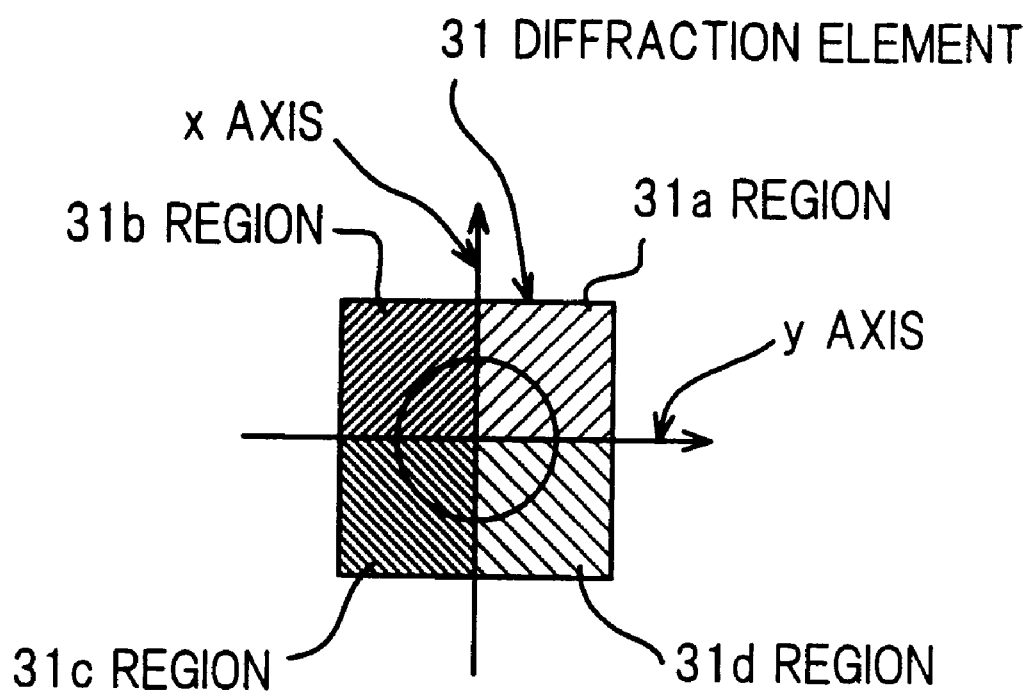
FIGS. 16A and 16B are plan views showing a diffraction element and a light-detecting means, respectively of a focusing error detecting equipment in an eleventh preferred embodiment according to the invention.
Figure 16B:
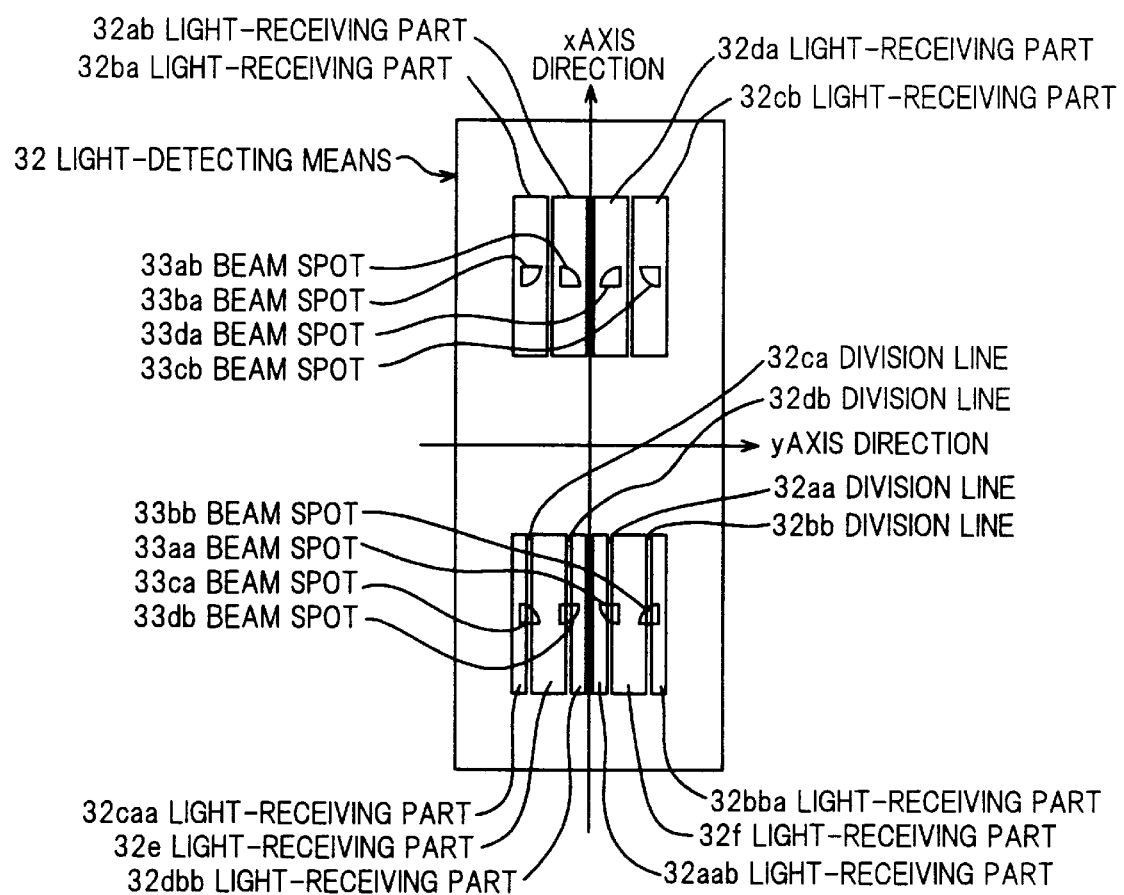

A focusing error detecting equipment in the eleventh preferred embodiment will be explained in FIGS. 16A and 16B. In the eleventh embodiment, the diffraction element 3 in the first embodiment is replaced by a diffraction element 31 and the light-detecting means 6 in the first embodiment is replaced by a light-detecting means 32. FIG. 16A is a plan view showing the diffraction element 31 and FIG. 16B is a plan view showing the light-detecting means 32. The diffraction element 31 generates +1st-order diffracted light to be converged before the light-detecting means 32 and –1st-order diffracted light to be converged behind the light-detecting means 32 when the focusing error detected object 5 is located at the convergence point of the image-forming means 4. The diffraction element 31 is divided into four regions 31*a* to 31*d* by x and y axes. Light diffracted by the region 31*a* forms beam spots 33*aa*, 33*ab* on the light-detecting means 32, light diffracted by the region 31*b* forms beam spots 33*ba*, 33*bb* on the light-detecting means 32, light diffracted by the region 31*c* forms beam spots 33*ca*, 33*cb* on the light-detecting means 32, and light diffracted by the region 31*d* forms beam spots 33*da*, 33*db* on the light-detecting means 32. The beam spots 33*aa*, 33*ba*, 33*ca* and 33*da* are beam spots to be formed by +1st-order diffracted light, and the beam spots 33*ab*, 33*bb*, 33*cb* and 33*db* are beam spots to be formed by –1st-order diffracted light.

Also, the beam spot 33*aa* is photoelectric-converted at light-receiving parts 32*f*, 32*aab* of the light-detecting means 32, the beam spot 33*bb* is photoelectric-converted at light-receiving parts 32*bba*, 32*f* of the light-detecting means 32, the beam spot 33*ca* is photoelectric-converted at light-receiving parts 32*caa*, 32*e* of the light-detecting means 32, the beam spot 33*db* is photoelectric-converted at light-receiving parts 32e, 32dbb of the light-detecting means 32, the beam spot 33ab is photoelectric-converted at a light-receiving part 32ab of the light-detecting means 32, the beam spot 33ba is photoelectric-converted at a light-receiving part 32ba of the light-detecting means 32, the beam spot 33cb is photoelectric-converted at a light-receiving part 32cb of the light-detecting means 32, and the beam spot 33da is photoelectric-converted at a light-receiving part 32da of the light-detecting means 32. Herein, provided that signals to be detected at the light-receiving parts 33aab to 32f are defined by signals S32aab to S32f, respectively, a focusing error is detected by a focusing error signal F11, which has the following relation with the signals S32aab to S32f:

$$F11 = S32f - S32aab - S32bba - S32e + S32caa + S32dbb.$$

Also, provided that points upon which +1st-order diffracted lights from the regions 31a, 31b, 31c and 31d are converged when the focusing error detected object 5 is located at the convergence point of the image-forming means 4 are defined by points P31a, P31b, P31c and P31d, respectively, interference fringes which appear at the respective regions 31a, 31b, 31c and 31d when point light sources are placed at a light-emitting point of the light-generating means 1 and the respective points P31a, P31b, P31c and P31d are recorded on the regions 31a, 31b, 31c and 31d of the diffraction element 31.

For example, when the focusing error detected object 5 is an optical disk, optical card or the like on which tracks or pit lines are formed, by positioning the tracks or pit lines of the focusing error detected object 5 to be parallel with the x or y axis, a tracking error is detected by tracking error signals T17, T18, which have the following relations with the signals S32ab to S32da. Also, by positioning the tracks or pit lines of the focusing error detected object 5 to be parallel with the y axis, a tracking error is detected by a tracking error signal T19. Further, by positioning the tracks or pit lines of the focusing error detected object 5 to be parallel with the x axis, a tracking error is detected by a tracking error signal T20.

1) When servomechanism by the heterodyne detection method is used,

T17=|a difference between the amplitude of (S32ab−S32ba+S32cb−S32da) to be retained when (S32ab+S32ba+S32cb+S32da) has a zero-cross rising and the amplitude of (S32ab−S32ba+S32cb−S32da) to be retained when (S32ab+S32ba+S32cb+S32da) has a zero-cross rising|

2) When servomechanism by the differential time detection method or the differential phase detection method is used, T18=|the amplitude conversion value of a time difference or phase difference between (S32ab+S32cb) and (S32ba+S32da)|

3) When servomechanism by the push-pull method is used, $$T19 = S32ab + S32ba - S32cb - S32da,$$

$$T20 = S32ab - S32ba - S32cb + S32da.$$

Meanwhile, when a tracking error is detected by the tracking error signal T19, the neighboring light-receiving parts 32ab, 32ba can be unified into one light-receiving part and the neighboring light-receiving parts 32cb, 32da can be unified into one light-receiving part. Thereby, the number of light-receiving parts decrease, the number of wirings can be reduced, and the material cost and fabrication steps can be therefore reduced, thereby improving the production yield. However, when a tracking error is detected by the tracking error signal T20, the tracking error signal may mix into the focusing error signal.

Also, in this composition, even when the light-generating means 1 is shifted to the direction of the z axis or even when the mirror 2 is shifted to the direction of the y axis to the light-detecting means 32, the cross point of the optical axis of the light diffracted by the region 31a of the diffraction element 31 and the light-detecting means 32 goes away from (or, on the contrary, comes close to) a division line 32aa, the cross point of the optical axis of the light diffracted by the region 31b of the diffraction element 31 and the light-detecting means 32 goes away from (or, on the contrary, comes close to) a division line 32bb, the cross point of the optical axis of the light diffracted by the region 31c of the diffraction element 31 and the light-detecting means 32 comes close to (or, on the contrary, goes away from) a division line 32ca, and the cross point of the optical axis of the light diffracted by the region 31d of the diffraction element 31 and the light-detecting means 32 comes close to (or, on the contrary, goes away from) a division line 32db. Thus, the increment and decrement of the focusing error detection sensitivities cancel. Furthermore, by detecting the focusing error in a far field, the focusing error detection sensitivity is almost not varied.

Further, even when the diffraction element 31 is rotated to the light-detecting means 32, the cross point of the optical axis of the light diffracted by the region 31a of the diffraction element 31 and the light-detecting means 32 goes away from (or, on the contrary, comes close to) the division line 32aa, the cross point of the optical axis of the light diffracted by the region 31b of the diffraction element 31 and the light-detecting means 32 goes away from (or, on the contrary, comes close to) the division line 32bb, the cross point of the optical axis of the light diffracted by the region 31c of the diffraction element 31 and the light-detecting means 32 comes close to (or, on the contrary, goes away from) the division line 32ca, and the cross point of the optical axis of the light diffracted by the region 31d of the diffraction element 31 and the light-detecting means 32 comes close to (or, on the contrary, goes away from) the division line 32db. Thus, the increment and decrement of the focusing error detection sensitivities cancel. Furthermore, by detecting the focusing error in a far field, the focusing error detection sensitivity is almost not varied.

On the other hand, even when the light-generating means 1 is shifted to the direction of the z axis or even when the mirror 2 is shifted to the direction of the y axis to the light-detecting means 32 or even when the diffraction element 31 is rotated to the light-detecting means 32, when the focusing error detected object 5 is located at the convergence point of the image-forming means 4, an area where the beam spot 33aa is supplied to the light-receiving part 32f (an area where the beam spot 33aa is supplied to the light-receiving part 32aab) is equal to an area where the beam spot 33bb is supplied to the light-receiving part 32bba (an area where the beam spot 33bb is supplied to the light-receiving part 32f), and an area where the beam spot 33ca is supplied to the light-receiving part 32e (an area where the beam spot 33ca is supplied to the light-receiving part 32caa) is equal to an area where the beam spot 33db is supplied to the light-receiving part 32dbb (an area where the beam spot 33db is supplied to the light-receiving part 32e). Therefore, no focusing offset occurs.

In the focusing error detection, used are diffracted lights which have a convergence point before the light-detecting means 32 and a convergence point behind the light-detecting means 32, respectively when the focusing error detected object 5 is located at the convergence point of the image-forming means 4. Here, the regions 31a and 31c to generate diffracted light with the convergence point before the light-detecting means 32 are located diagonally, and the regions 31b and 31d to generate diffracted light with the convergence point behind the light-detecting means 32 are located diagonally. Therefore, even when the diffraction element 31 is shifted to the direction of the x or y axis, there occurs no focusing offset.

Figure 17A:
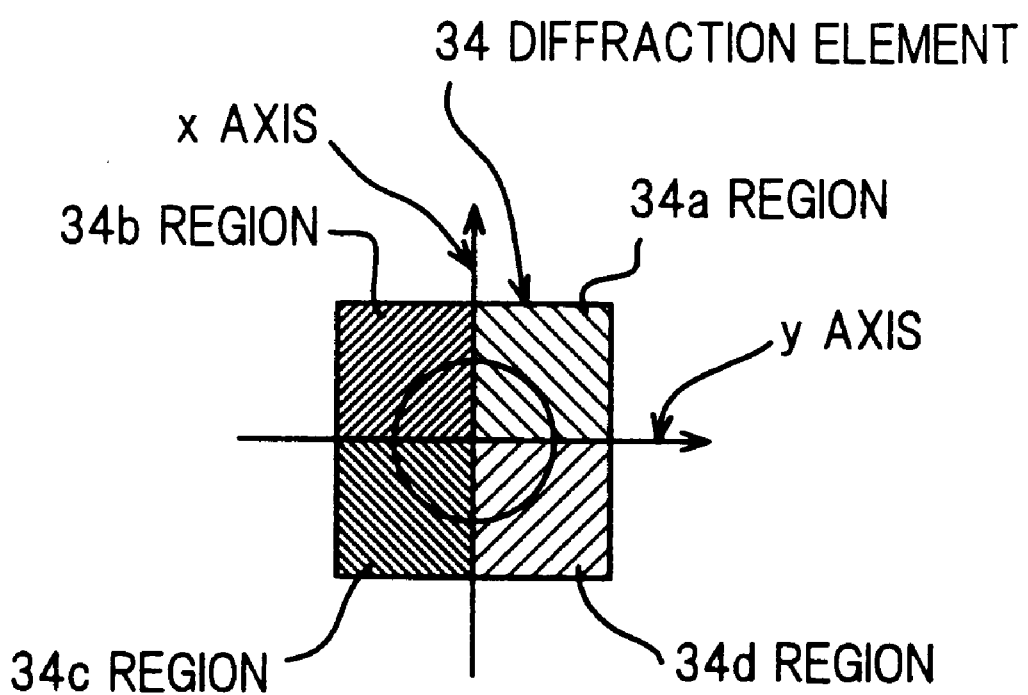
FIGS. 17A and 17B are plan views showing a diffraction element and a light-detecting means, respectively of a focusing error detecting equipment in a twelfth preferred embodiment according to the invention.
Figure 17B:
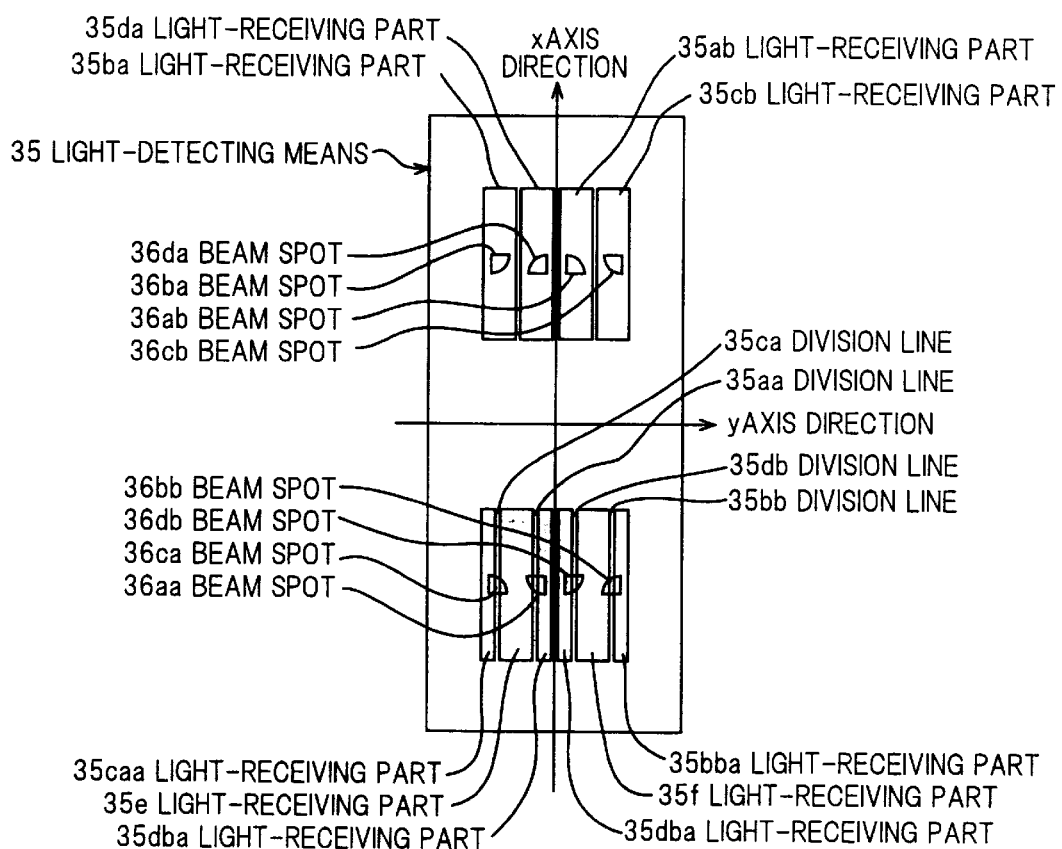

A focusing error detecting equipment in the twelfth preferred embodiment will be explained in FIGS. 17A and 17B. In the twelfth embodiment, the diffraction element 3 in the first embodiment is replaced by a diffraction element 34 and the light-detecting means 6 in the first embodiment is replaced by a light-detecting means 35. FIG. 17A is a plan view showing diffraction element 34 and FIG. 17B is a plan view showing the light-detecting means 35. The diffraction element 34 generates +1st-order light to be converged before the light-detecting means 35 and −1st-order diffracted light to be converged behind the light-detecting means 35 when the focusing error detected object 5 is located at the convergence point of the image-forming means 4. The diffraction element 34 is divided into four regions 34a to 34d by x and y axes. Light diffracted by the region 34a forms beam spots 36aa, 36ab on the light-detecting means 35, light diffracted by the region 34b forms beam spots 36ba, 36bb on the light-detecting means 35, light diffracted by the region 34c forms beam spots 36ca, 36cb on the light-detecting means 35, and light diffracted by the region 34d forms beam spots 36da, 36db on the light-detecting means 35. The beam spots 36aa, 36ba, 36ca and 36da are beam spots to be formed by +1st-order diffracted light, and the beam spots 36ab, 36bb, 36cb and 36db are beam spots to be formed by −1st-order diffracted light.

Also, the beam spot 36aa is photoelectric-converted at light-receiving parts 35aaa, 35e of the light-detecting means 35, the beam spot 36bb is photoelectric-converted at light-receiving parts 35a, 35f of the light-detecting means 35, the beam spot 36ca is photoelectric-converted at light-receiving parts 35caa, 35e of the light-detecting means 35, the beam spot 36db is photoelectric-converted at light-receiving parts 35dba, 35f of the light-detecting means 35, the beam spot 36ab is photoelectric-converted at a light-receiving part 35ab of the light-detecting means 35, the beam spot 36ba is photoelectric-converted at a light-receiving part 35ba of the light-detecting means 35, the beam spot 36db is photoelectric-converted at a light-receiving part 35cb of the light-detecting means 35, and the beam spot 36da is photoelectric-converted at a light-receiving part 35da of the light-detecting means 35. Herein, provided that signals to be detected at the light-receiving parts 35aaa to 35f are defined by signals S35aaa to S35f, respectively, a focusing error is detected by a focusing error signal F12, which has the following relation with the signals S35aaa to S35f:

$$F12=S35e-S35caa-S35aaa-S35f+S35baa+S35dba.$$

Also, provided that points upon which +1st-order diffracted lights from the regions 34a, 34b, 34c and 34d are converged when the focusing error detected object 5 is located at the convergence point of the image-forming means 4 are defined by points P34a, P34b, P34c and P34d, respectively, interference fringes which appear at the respective regions 34a, 34b, 34c and 34d when point light sources are placed at a light-emitting point of the light-generating means 1 and the respective points P34a, P34b, P34c and P34d are recorded on the regions 34a, 34b, 34c and 34d of the diffraction element 34.

For example, when the focusing error detected object 5 is an optical disk, optical card or the like on which tracks or pit lines are formed, by positioning the tracks or pit lines of the focusing error detected object 5 to be parallel with the x or y axis, a tracking error is detected by tracking error signals T21, T22, which have the following relations with the signals S35ab to S35da. Also, by positioning the tracks or pit lines of the focusing error detected object 5 to be parallel with the y axis, a tracking error is detected by a tracking error signal T23. Further, by positioning the tracks or pit lines of the focusing error detected object 5 to be parallel with the x axis, a tracking error is detected by a tracking error signal T24.

1) When servomechanism by the heterodyne detection method is used,

T21=|a difference between the amplitude of (S35ab−S35ba+S35cb−S35da) to be retained when (S35ab+S35ba+S35cb+S35da) has a zero-cross rising and the amplitude of (S35ab−S35ba+S35cb−S35da) to be retained when (S35ab+S35ba+S35cb+S35da) has a zero-cross rising|

2) When servomechanism by the differential time detection method or the differential phase detection method is used, T22=|the amplitude conversion value of a time difference or phase difference between (S35ab+S35cb) and (S35ba+S35da)|

3) When servomechanism by the push-pull method is used, $$T23=S35ab+S35ba-S35cb-S35da,$$

$$T24=S35ab-S35ba-S35cb+S35da.$$

Meanwhile, when a tracking error is detected by the tracking error signals T21, T22, the neighboring light-receiving parts 35ab, 35cb can be unified into one light-receiving part and the neighboring light-receiving parts 32ba, 32da can be unified into one light-receiving part. Thereby, the number of light-receiving parts decrease, the number of wirings can be reduced, and the material cost and fabrication steps can be therefore reduced, thereby improving the production yield. However, when a tracking error is detected by the tracking error signal T24, the tracking error signal may mix into the focusing error signal.

Also, in this composition, even when the light-generating means 1 is shifted to the direction of the z axis or even when the mirror 2 is shifted to the direction of the y axis to the light-detecting means 35, the cross point of the optical axis of the light diffracted by the region 34a of the diffraction element 34 and the light-detecting means 35 goes away from (or, on the contrary, comes close to) a division line 35aa, the cross point of the optical axis of the light diffracted by the region 34b of the diffraction element 34 and the light-detecting means 35 goes away from (or, on the contrary, comes close to) a division line 35bb, the cross point of the optical axis of the light diffracted by the region 34c of the diffraction element 34 and the light-detecting means 35 comes close to (or, on the contrary, goes away from) a division line 35ca, and the cross point of the optical axis of the light diffracted by the region 34d of the diffraction element 34 and the light-detecting means 35 comes close to (or, on the contrary, goes away from) a division line 35db. Thus, the increment and decrement of the focusing error detection sensitivities cancel. Furthermore, by detecting the focusing error in a far field, the focusing error detection sensitivity is almost not varied.

Further, even when the diffraction element 34 is rotated to the light-detecting means 35, the cross point of the optical axis of the light diffracted by the region 34a of the diffraction element 34 and the light-detecting means 35 goes away from (or, on the contrary, comes close to) the division line 35aa, the cross point of the optical axis of the light diffracted by the region 34b of the diffraction element 34 and the light-detecting means 35 goes away from (or, on the contrary, comes close to) the division line 35bb, the cross point of the optical axis of the light diffracted by the region 34c of the diffraction element 34 and the light-detecting means 35 comes close to (or, on the contrary, goes away from ) the division line 35ca, and the cross point of the optical axis of the light diffracted by the region 34d of the diffraction element 34 and the light-detecting means 35 comes close to (or, on the contrary, goes away from) the division line 35db. Thus, the increment and decrement of the focusing error detection sensitivities cancel. Furthermore, by detecting the focusing error in a far field, the focusing error detection sensitivity is almost not varied.

On the other hand, even when the light-generating means 1 is shifted to the direction of the z axis or even when the mirror 2 is shifted to the direction of the y axis to the light-detecting means 35 or even when the diffraction element 34 is rotated to the light-detecting means 35, when the focusing error detected object 5 is located at the convergence point of the image-forming means 4, an area where the beam spot 36aa is supplied to the light-receiving part 35aaa (an area where the beam spot 36aa is supplied to the light-receiving part 35e) is equal to an area where the beam spot 36bb is supplied to the light-receiving part 35bba (an area where the beam spot 36bb is supplied to the light-receiving part 35f), and an area where the beam spot 36ca is supplied to the light-receiving part 35e (an area where the beam spot 36ca is supplied to the light-receiving part 35caa) is equal to an area where the beam spot 36db is supplied to the light-receiving part 35f (an area where the beam spot 36db is supplied to the light-receiving part 35dba). Therefore, no focusing offset occurs.

In the focusing error detection, used are diffracted lights which have a convergence point before the light-detecting means 35 and a convergence point behind the light-detecting means 35, respectively when the focusing error detected object 5 is located at the convergence point of the image-forming means 4. Here, the regions 34a and 34c to generate diffracted light with the convergence point before the light-detecting means 35 are located diagonally, and the regions 34b and 34d to generate diffracted light with the convergence point behind the light-detecting means 35 are located diagonally. Therefore, even when the diffraction element 31 is shifted to the direction of the x or y axis, there occurs no focusing offset.

Figure 18:
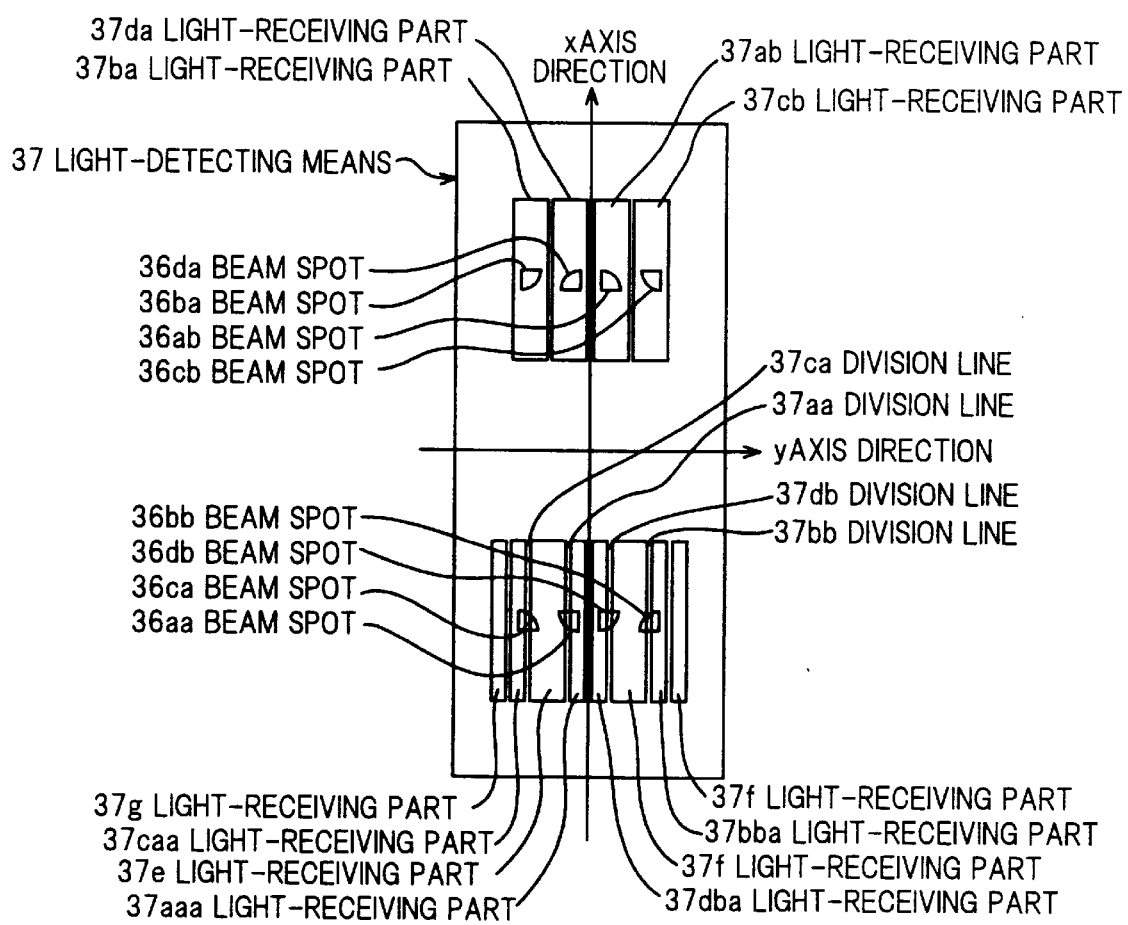
FIG. 18 is a plan view showing a light-detecting means of a focusing error detecting equipment in a thirteenth preferred embodiment according to the invention.

A focusing error detecting equipment in the thirteenth preferred embodiment will be explained in FIG. 18. In the thirteenth embodiment, the light-detecting means 35 in the twelfth embodiment is replaced by a light-detecting means 37. FIG. 18 is a plan view showing the light-detecting means 37. A beam spot 36aa is photoelectric-converted at light-receiving parts 37aaa, 37e of the light-detecting means 37, a beam spot 36bb is photoelectric-converted at light-receiving parts 37bba, 37f of the light-detecting means 37, a beam spot 36ca is photoelectric-converted at light-receiving parts 37caa, 37e of the light-detecting means 37, a beam spot 36db is photoelectric-converted at light-receiving parts 37dba, 37f of the light-detecting means 37, and a beam spot 36ab is photoelectric-converted at a light-receiving part 37ab of the light-detecting means 37, a beam spot 36ba is photoelectric-converted at a light-receiving part 37ba of the light-detecting means 37, a beam spot 36cb is photoelectric-converted at a light-receiving part 37cb of the light-detecting means 37, and a beam spot 36da is photoelectric-converted at a light-receiving part 37da of the light-detecting means 37. Herein, provided that signals to be detected at the light-receiving parts 37aaa to 37h are defined by signals S37aaa to S37h, respectively, a focusing error is detected by a focusing error signal F13, which has the following relation with the signals S37aaa to S37h:

$$F13 = S37e - S37caa - S37aaa - S37f + S37bba + S37dba + S37g - S37h.$$

For example, when the focusing error detected object 5 is an optical disk, optical card or the like on which tracks or pit lines are formed, by positioning the tracks or pit lines of the focusing error detected object 5 to be parallel with the x or y axis, a tracking error is detected like the twelfth embodiment, by using the signals S37ab to S37da. Namely, the tracking error can be detected by replacing the signal S35ab with the signal S37ab, replacing the signal S35ba with the signal S37ba, replacing the signal 35cb with the S37cb and replacing the signal S35da with the signal S37da.

Figure 19:
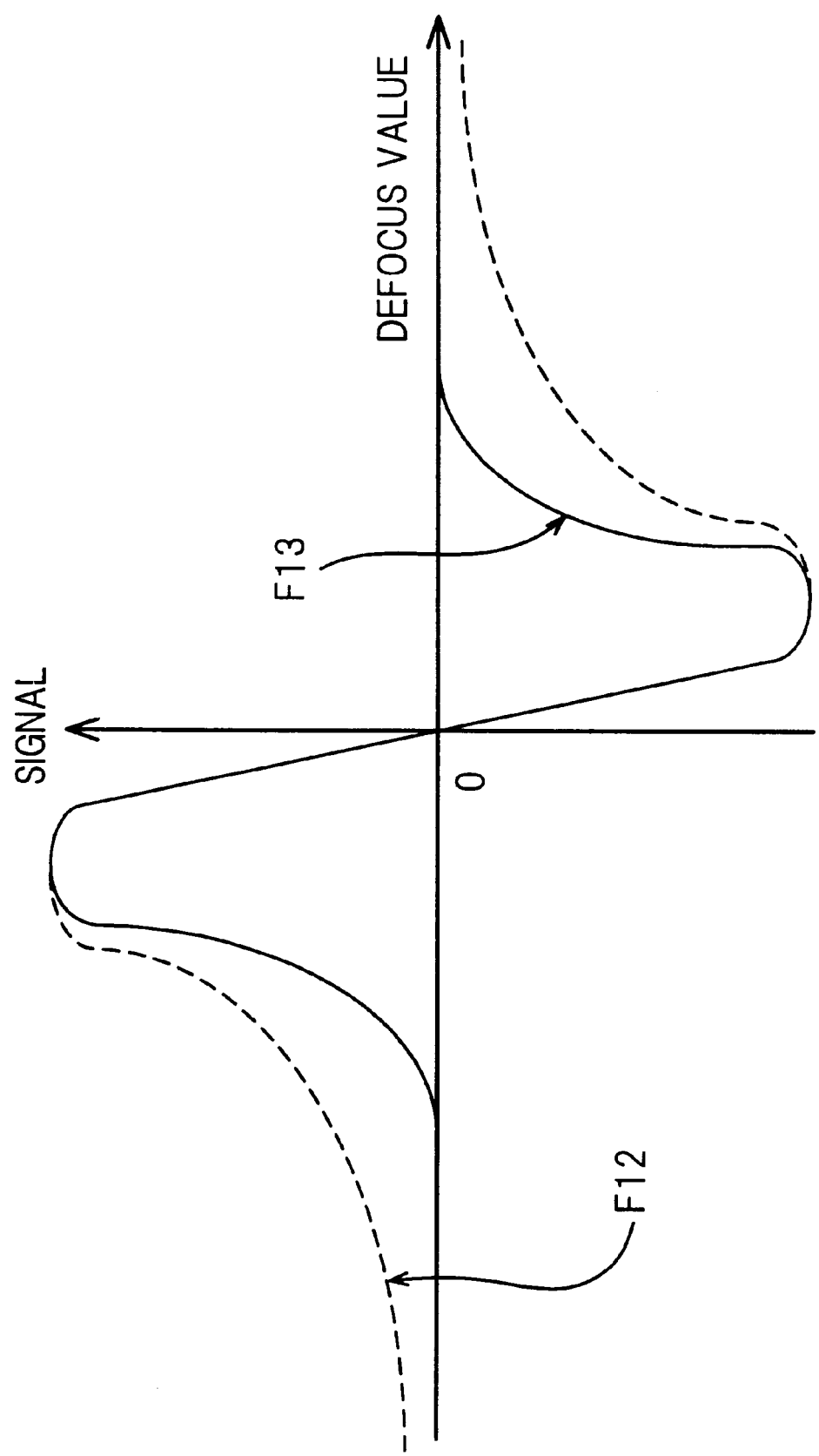
FIG. 19 is a graph showing focusing error signals F12, F13 to defocus value in the twelfth and thirteenth embodiments.

FIG. 19 shows focusing error signals F12, F13 to defocus values. In the thirteenth embodiment, by providing the light-receiving parts 37g, 37h with the light-detecting means 37, the convergence of focusing error signal to defocusing can be accelerated, e.g. even when a multilayer optical disk is used as the focusing error detected object 5, signals corresponding to the respective layers are not mixed with each other and a focusing error signal having no focusing offset can be obtained, while having the advantages in the twelfth embodiment that the focusing error detection sensitivity is almost not varied and no focusing offset occurs or the focusing offset can be removed. Such a technique that additional light-receiving parts are disposed to accelerate the convergence of focusing error signal to defocusing can be applied to the first to twelfth embodiments of the invention.

Meanwhile, the first to thirteenth embodiments of the invention, the device size can be miniaturized and easily fabricated by using a laser diode as the light-generating means 1 and using a photodiode as the light-detecting means. Also, as the diffraction element, glass where grooves with a pitch of nearly a light wavelength are etched, plastics where grooves with a pitch of nearly a light wavelength are stamped, lithium niobate crystal where proton-exchanging with a pitch of nearly a light wavelength is given or the like may be used. Further, as the image-forming means 4, a single lens or combined lenses may be used. The heat sink 7 may be of aluminum nitride, silicon carbide, silicon or the like. The mirror 2 may be conveniently glass on which dielectric multilayer film or metal film is coated.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A focusing error detecting equipment, comprising:
   a light-generating means;
   an image-forming means for converging light to be emitted from said light-generating means upon a focusing error detected object;
   a diffraction element for diffracting light to be reflected on said focusing error detected object; and a light-detecting means for receiving lights to be separated by said diffraction element;

wherein said diffraction element is divided into four regions a, b, c and d by a boundary plane α and a boundary plane β, where said boundary plane α and boundary plane β are defined by two planes which include an optical axis of said reflected light from said focusing error detected object and are orthogonal to each other, said regions a and c to be located diagonally diffracting said reflected light into lights with a convergence point before said light-detecting means and said regions b and d to be located diagonally diffracting said reflected light into lights with a convergence point behind said light-detecting means, said light-detecting means comprises light-receiving parts ea and eb which are divided by a division line e parallel with said boundary plane α, light-receiving parts fa and fb which are divided by a division line f parallel with said boundary plane α, light-receiving parts ga and gb which are divided by a division line g parallel with said boundary plane α and light-receiving parts ha and hb which are divided by a division line h parallel with said boundary plane α, and a focusing error is detected by a focusing error signal F obtained by:

$$F=Sea-Seb-Sfa+Sfb+Sga-Sgb-Sha+Shb$$

where signals Sea, Seb, Sfa, Sfb, Sga, Sgb, Sha and Shb are defined by signals to be detected at said light-receiving parts ea, eb, fa, fb, ga, gb, ha and hb, respectively when said diffracted lights from said regions a, b, c and d have optical axes to be passed through said light-receiving parts ea, fa, ga and ha, respectively and beam spots to be formed by said diffracted lights from said regions a, b, c and d are laid across said division lines e, f, g and h, respectively when said focusing error detected object is located at a convergence point of said image-forming means.

2. A focusing error detecting equipment, according to claim 1, wherein:

said light-receiving parts ea, eb, ga and gb are disposed in one of two regions to be divided by said boundary plane β and said light-receiving parts fa, fb, ha and hb are disposed in the other of two regions to be divided by said boundary plane β.

3. A focusing error detecting equipment, according to claim 1, wherein:

said light-receiving parts ea, eb, ha and hb are disposed in one of two regions to be divided by said boundary plane β and said light-receiving parts fa, fb, ga and gb are disposed in the other of two regions to be divided by said boundary plane β.

4. A focusing error detecting equipment, according to claim 1, wherein:

said light-receiving parts ea, eb, fa, fb, ga, gb, ha and hb are disposed in one of two regions to be divided by said boundary plane β.

5. A focusing error detecting equipment, according to claim 1, further comprising:

a mirror for perpendicularly reflecting light to be horizontally emitted from said light-generating means, said mirror being disposed on said light-detecting means;

wherein said light-generating means is horizontally disposed on said light-detecting means, and said diffraction element, said image-forming means and said focusing error detected object are positioned on an optical axis of said reflected light from said mirror, and said reflected light from said focusing error detected object is reversely passed through said image-forming means and then said diffraction element, diffracted and separated by said diffraction element, then projected on said light-receiving parts disposed on said light-detecting means.

6. A focusing error detecting equipment, according to claim 2, further comprising:

a mirror for perpendicularly reflecting light to be horizontally emitted from said light-generating means, said mirror being disposed on said light-detecting means;

wherein said light-generating means is horizontally disposed on said light-detecting means, and said diffraction element, said image-forming means and said focusing error detected object are positioned on an optical axis of said reflected light from said mirror, and said reflected light from said focusing error detected object is reversely passed through said image-forming means and then said diffraction element, diffracted and separated by said diffraction element, then projected on said light-receiving parts disposed on said light-detecting means.

7. A focusing error detecting equipment, according to claim 3, further comprising:

a mirror for perpendicularly reflecting light to be horizontally emitted from said light-generating means, said mirror being disposed on said light-detecting means;

wherein said light-generating means is horizontally disposed on said light-detecting means, and said diffraction element, said image-forming means and said focusing error detected object are positioned on an optical axis of said reflected light from said mirror, and said reflected light from said focusing error detected object is reversely passed through said image-forming means and then said diffraction element, diffracted and separated by said diffraction element, then projected on said light-receiving parts disposed on said light-detecting means.

8. A focusing error detecting equipment, according to claim 4, further comprising:

a mirror for perpendicularly reflecting light to be horizontally emitted from said light-generating means, said mirror being disposed on said light-detecting means;

wherein said light-generating means is horizontally disposed on said light-detecting means, and said diffraction element, said image-forming means and said focusing error detected object are positioned on an optical axis of said reflected light from said mirror, and said reflected light from said focusing error detected object is reversely passed through said image-forming means and then said diffraction element, diffracted and separated by said diffraction element, then projected on said light-receiving parts disposed on said light-detecting means.

9. A focusing error detecting equipment, according to claim 5, wherein:

said light-generating means is a semiconductor laser, said image-forming means is an objective lens, said focusing error detected object is an optical disk or optical card and said light-detecting means is a photodiode.

10. A focusing error detecting equipment, according to claim 6, wherein:

said light-generating means is a semiconductor laser, said image-forming means is an objective lens, said focusing error detected object is an optical disk or optical card and said light-detecting means is a photodiode.

11. A focusing error detecting equipment, according to claim 7 wherein:

said light-generating means is a semiconductor laser, said image-forming means is an objective lens, said focusing error detected object is an optical disk or optical card and said light-detecting means is a photodiode.

12. A focusing error detecting equipment, according to claim 8, wherein:

said light-generating means is a semiconductor laser, said image-forming means is an objective lens, said focusing error detected object is an optical disk or optical card and said light-detecting means is a photodiode.

\* \* \* \* \*